(12) United States Patent
Maruyama et al.

(10) Patent No.: US 10,007,665 B2
(45) Date of Patent: Jun. 26, 2018

(54) DISPLAYING NODES ON A VIEW SCREEN

(71) Applicant: International Business Machines Corporation, Armonk, NY (US)

(72) Inventors: Daisuke Maruyama, Kanagawa (JP); Tadahiko Nakamura, Kanagawa (JP); Kenji Uchida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 14/878,022

(22) Filed: Oct. 8, 2015

(65) Prior Publication Data
US 2016/0117058 A1 Apr. 28, 2016

(30) Foreign Application Priority Data
Oct. 23, 2014 (JP) .................................. 2014-216382

(51) Int. Cl.
*G06F 3/0482* (2013.01)
*G06F 17/30* (2006.01)
(Continued)

(52) U.S. Cl.
CPC ............ *G06F 17/30* (2013.01); *G06F 3/0481* (2013.01); *G06F 3/0482* (2013.01);
(Continued)

(58) Field of Classification Search
CPC .. G06F 3/0482; G06F 3/0481; G06F 3/04842; G06F 9/4443; G06F 17/30994; G06F 17/30873; G06F 17/30; G06Q 10/10
See application file for complete search history.

(56) References Cited

U.S. PATENT DOCUMENTS 5,619,632 A * 4/1997 Lamping ............... G06T 11/206
345/441
5,870,559 A * 2/1999 Leshem .................. G06F 11/32
707/E17.116
(Continued)

FOREIGN PATENT DOCUMENTS

JP            05210472           8/1993
JP           H05323872         12/1993
(Continued)

OTHER PUBLICATIONS

"Notification of Reasons for Refusal," Application No. JP2014-216382, Dated Mar. 9, 2016, 6 pages.
(Continued)

*Primary Examiner* — Tuyetlien T Tran
(74) *Attorney, Agent, or Firm* — Jared C. Chaney

(57) ABSTRACT

The present invention provides a method of displaying nodes, including: displaying, in response to that one or more nodes are selected on a view screen on which nodes are displayed together with respective connection lines between the nodes, the selected one or more nodes on a pallet; drawing connection lines extending from the one or more nodes displayed on the pallet, on the view screen; and scrolling, in response to that one or more connection lines extending from the one or more nodes displayed on the pallet are selected or that one or more nodes on the pallet are selected, a display on the view screen such that one or more nodes at connection destinations of the selected connection lines or the selected nodes are displayed within the view screen.

6 Claims, 21 Drawing Sheets

(51) Int. Cl.
*G06F 3/0484* (2013.01)
*G06F 3/0481* (2013.01)
*G06Q 10/10* (2012.01)
*G06F 9/44* (2018.01)

(52) U.S. Cl.
CPC .... *G06F 3/04842* (2013.01); *G06F 17/30324* (2013.01); *G06F 9/4443* (2013.01); *G06F 17/30873* (2013.01); *G06F 17/30994* (2013.01); *G06Q 10/10* (2013.01)

(56) References Cited

U.S. PATENT DOCUMENTS

| | | | | |
|---|---|---|---|---|
| 5,917,492 | A * | 6/1999 | Bereiter | G06F 3/0481 715/799 |
| 2003/0081013 | A1* | 5/2003 | Allen | G06F 3/0482 715/853 |
| 2004/0205638 | A1 | 10/2004 | Thomas et al. | |
| 2010/0333039 | A1 | 12/2010 | Denkel | |
| 2012/0198390 | A1* | 8/2012 | Bogusky | G06Q 10/06 715/854 |
| 2013/0167071 | A1* | 6/2013 | Horiuchi | G06F 3/0484 715/789 |
| 2014/0173444 | A1* | 6/2014 | Wu | G06F 3/04842 715/734 |
| 2017/0083193 | A1 | 3/2017 | Kamiyama et al. | |

FOREIGN PATENT DOCUMENTS

| | | |
|---|---|---|
| JP | 06266727 | 9/1994 |
| JP | 08054998 | 2/1996 |
| JP | 09171452 | 6/1997 |
| JP | H1024280 | 1/1998 |
| JP | H10-124280 * | 5/1998 |
| JP | H10124280 A | 5/1998 |
| JP | 2004227281 | 8/2004 |
| JP | 2007140843 | 6/2007 |
| JP | 2011164830 | 8/2011 |
| JP | 2013077211 | 4/2013 |
| JP | 2013131018 | 7/2013 |
| JP | 2013161455 | 8/2013 |
| JP | 2014170277 | 9/2014 |
| JP | 5988450 B2 | 9/2016 |

OTHER PUBLICATIONS

"Written Amendment," Reference No. JP140109A, Application No. JP2014-216382, Dated Dec. 24, 2016, 7 pages.
"Written Argument," Reference No. JP140109A, Application No. JP2014-216382, Dated Dec. 24, 2016, 7 pages.
Maruyama et al., "Displaying Nodes on a View Screen," U.S. Appl. No. 15/434,135, filed Feb. 16, 2017.
List of IBM Patents or Patent Applications Treated as Related, Signed Feb. 13, 2017, 2 pages.
"Decision to Grant a Patent," for patent titled "A computer and its computer program for displaying the method of displaying a node, and a node," Patent Application No. 2014-216382, Dated Dec. 24, 2016, 3 pages.

* cited by examiner

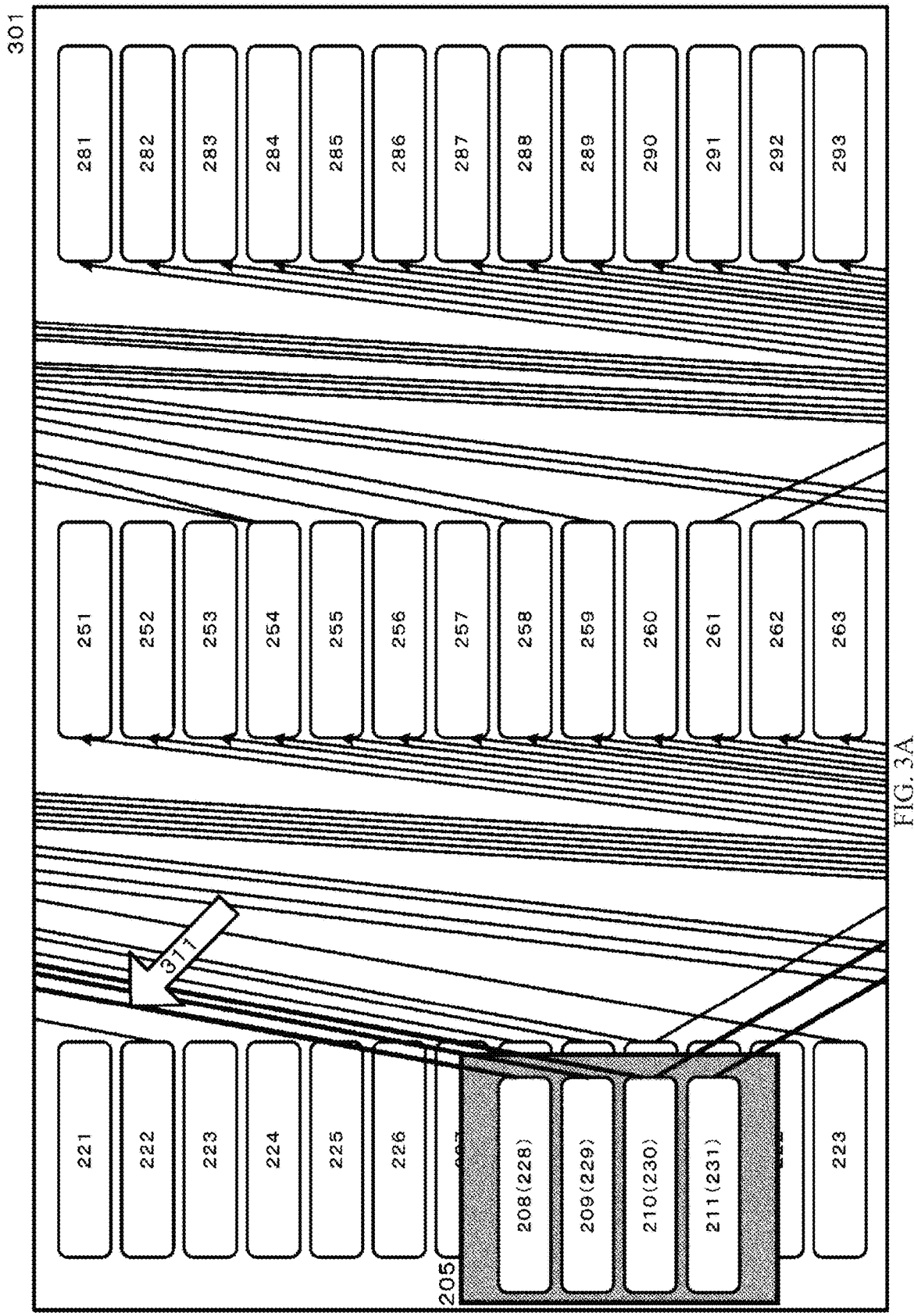

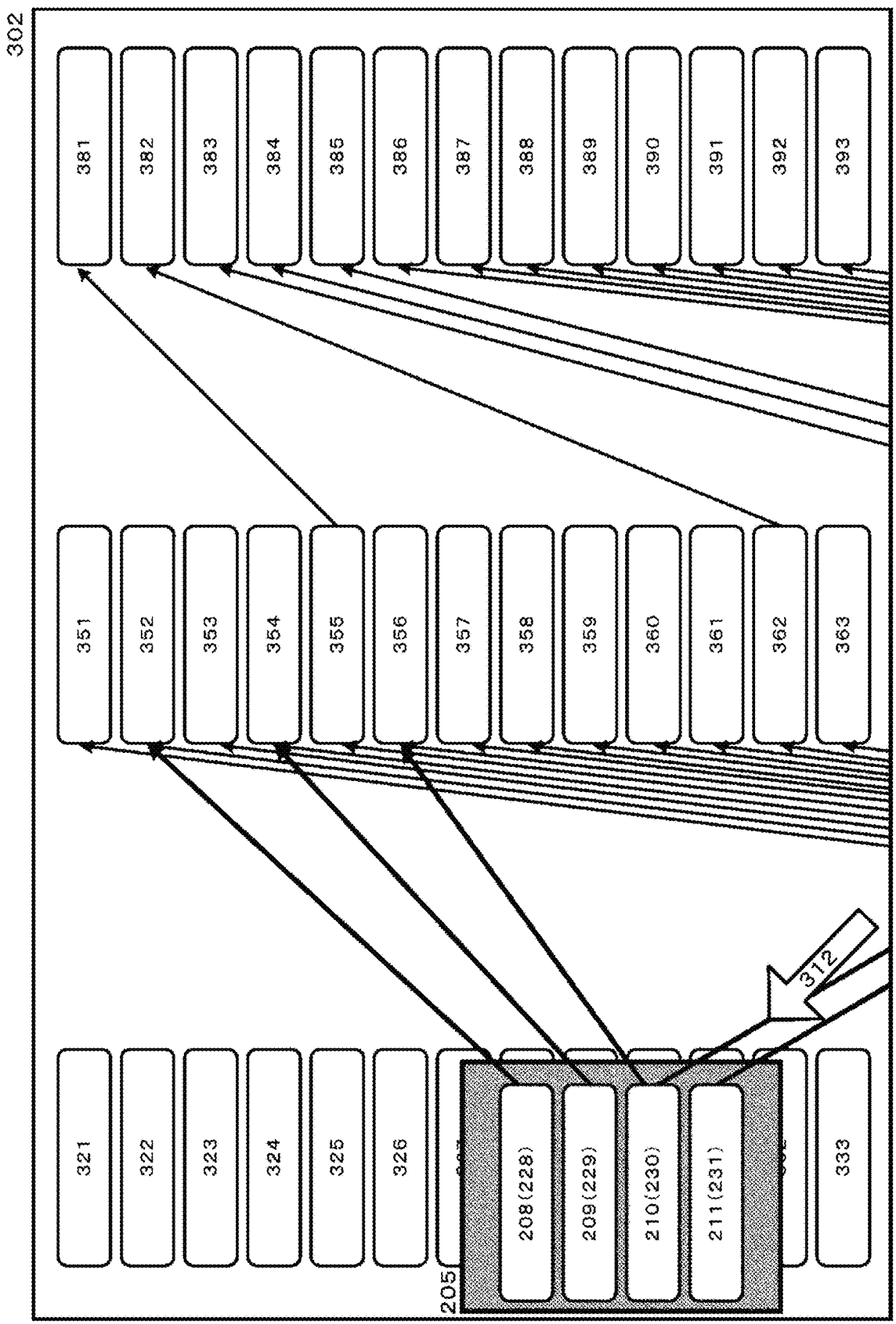

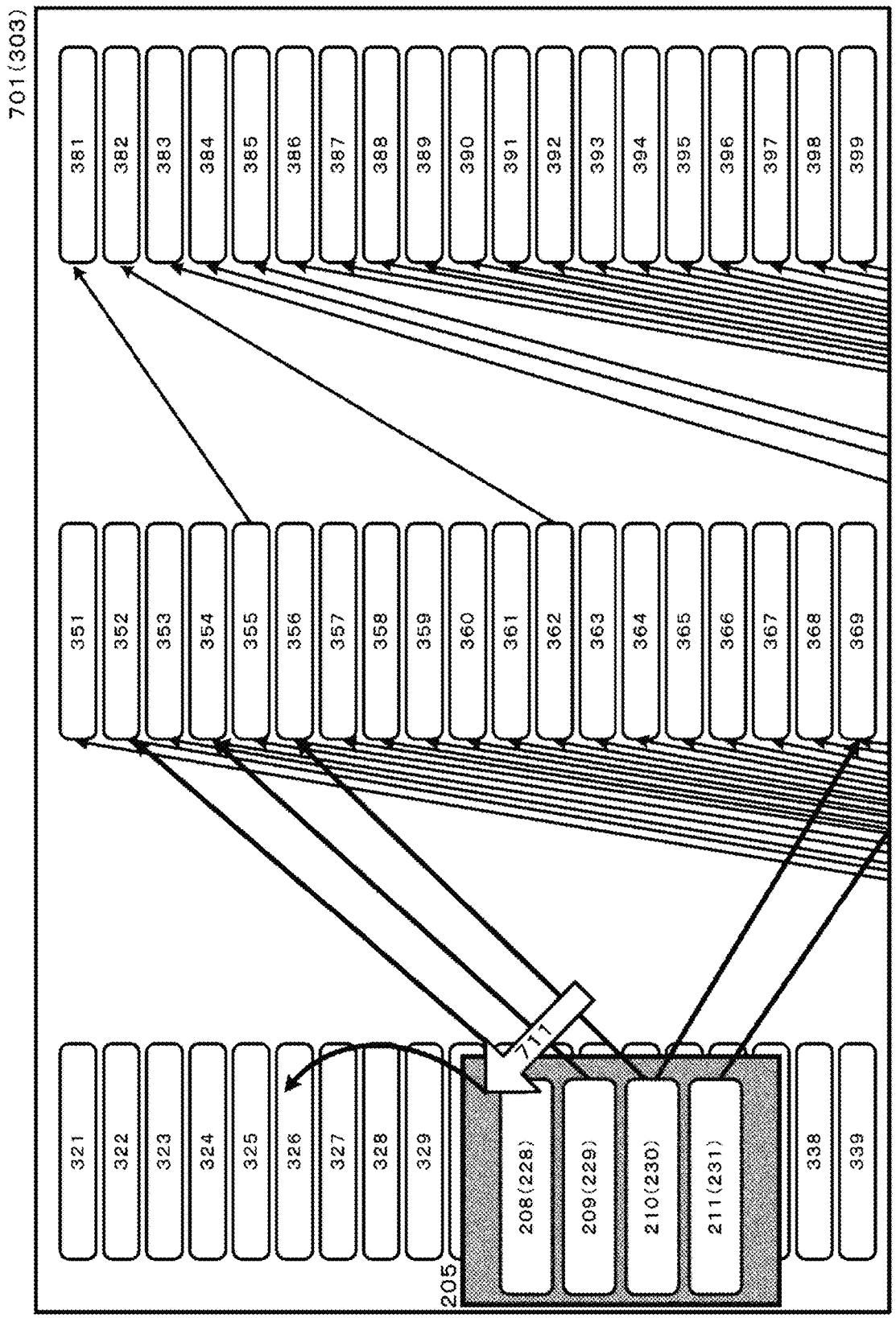

DISPLAYING NODES ON A VIEW SCREEN

TECHNICAL FIELD

The present invention relates to a graphical user interface, and more particularly, to a technique of displaying nodes.

BACKGROUND

It is a common practice to display, as a diagram, a plurality of nodes and respective connection lines (also referred to as edges) between the nodes.

For example, a diagram is used in order to check a relation of developed deliverables. In the diagram, the deliverables are displayed as nodes, and respective associations between the nodes are displayed as respective connection lines between the nodes.

The diagram is also used in order to display, for example, linked open data (LOD). The linked open data refers to a set of best practices for establishing the web of pieces of data, that is, publishing and connecting pieces of data on the web.

BRIEF SUMMARY

The present invention provides a method, and associated computer and computer program product, for displaying nodes.

A processor of a computer displays a view screen on which a plurality of nodes of multiple nodes are displayed together with multiple connection lines, wherein each node of the displayed plurality of nodes is displayed as being in direct physical contact with at least one connection line of the multiple connection lines, and wherein a display of the computer comprises the view screen;

The processor receives a selection of one or more nodes of the displayed plurality of nodes;

In response to having received the selection of one or more nodes, the processor displaying, on a pallet on the view screen, the selected one or more nodes, wherein the pallet on the view screen partially covers each node of the one or more nodes so that a covered portion of each covered node is not visible on the view screen.

The processor draws on the view screen, for each node of the one or more nodes displayed on the pallet, one or more connection lines extending from each node of the one or more nodes displayed on the pallet, wherein each extending connection line corresponds to a respective connection line of the at least one connection line in direct physical contact with each node of the selected one or more nodes, and wherein each extending connection line is connected to a respective destination node, of the multiple nodes, that is not being currently displayed on the view screen.

The processor scrolls and zooms out the view screen, after which each respective destination node is displayed in the view screen together with the pallet and the extending connection lines extending from each node of the one or more nodes displayed on the pallet.

BRIEF DESCRIPTION OF THE DRAWINGS

FIG. 3A illustrates an example aspect in which the user selects any of the connection lines extending from the nodes displayed on the pallet illustrated in FIG. 2C, according to the embodiment of the present invention.

FIG. 3B illustrates: an example aspect in which the display on the view screen is scrolled such that the node at the connection destination of the connection line that is selected by the user in FIG. 3A is displayed on the view screen; and an example aspect in which the user further selects any of the connection lines extending from the nodes displayed on the pallet illustrated in FIG. 2C, according to the embodiment of the present invention.

FIG. 7A illustrates an example aspect in which the pallet is moved on the view screen, according to the embodiment of the present invention.

DETAILED DESCRIPTION

Figure 1:
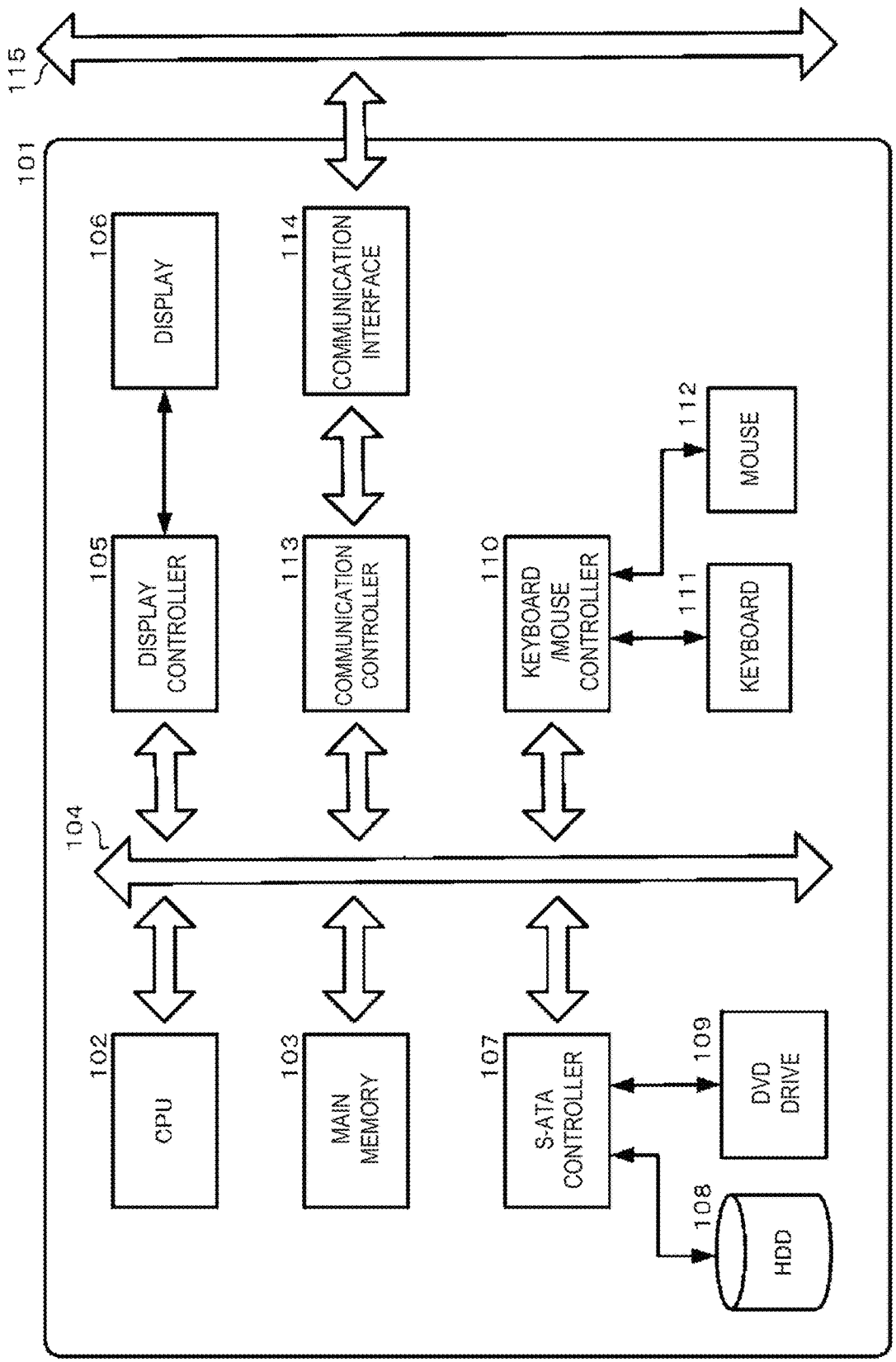
FIG. 1 is a diagram illustrating an example computer according to an embodiment of the present invention or usable in the embodiment of the present invention.

For a diagram in which a plurality of associated nodes are displayed, there is a problem that, if the number of displayed nodes is large, an entire relation of the nodes cannot be easily viewed due to restrictions by the size of a screen and the like.

Moreover, in the case where associated nodes are located far from each other, there is a problem that a large scroll operation is necessary to look around the associated nodes.

Further, in the case where associated nodes are located far from each other, there are problems that the association between the nodes is difficult to understand and that it is also difficult to move between the nodes.

The present invention, which has been made in order to solve the above-mentioned problems, provides a graphical user interface that enables easy viewing of nodes of a user's interest and nodes associated with the nodes of interest.

The present invention provides a technique of displaying nodes. The technique can include a method of displaying nodes, and a computer, computer program and computer program product for displaying nodes.

In a first aspect according to the present invention, a method of displaying nodes includes the steps, executed by a computer, of: displaying a view screen on which a plurality of nodes are displayed together with respective connection lines between the nodes; displaying, in response to one or more nodes selected by a user on the view screen, the selected one or more nodes on a pallet; drawing connection lines extending from the one or more nodes displayed on the pallet, on the view screen; and scrolling and optionally zooming out, in response to (i) a selection of one or more connection lines extending from the one or more nodes displayed on the pallet or (ii) a selection of one or more nodes on the pallet, a display on the view screen such that one or more nodes at connection destinations of the selected connection lines or one or more nodes at connection destinations of connection lines extending from the selected nodes are displayed within the view screen.

In an embodiment of the present invention, the method can further include a step, executed by the computer, of: scrolling and optionally zooming out, in response to that one or more connection lines extending from the one or more nodes displayed on the pallet are further selected or that one or more nodes on the pallet are further selected, the display on the view screen such that one or more nodes at connection destinations of the further selected connection lines or one or more nodes at connection destinations of connection lines extending from the further selected nodes are displayed within the view screen.

In an embodiment of the present invention, the method can further include the steps, executed by the computer, of: displaying, in response to detection of an action of adding one or more nodes on the view screen to the pallet, the nodes to be added, on the pallet; drawing connection lines, extending from the nodes added to the pallet, on the view screen; and scrolling and optionally zooming out, in response to (i) one or more connection lines extending from the one or more nodes displayed on the pallet to which the nodes are added are selected or (ii) one or more nodes on the pallet to which the nodes are added are selected, the display on the view screen such that one or more nodes at connection destinations of the selected connection lines or one or more nodes at connection destinations of connection lines extending from the selected nodes are displayed within the view screen.

In an embodiment of the present invention, the method can further include the steps, executed by the computer, of: deleting, in response to detection of an action of deleting one or more nodes displayed on the pallet, a display of the nodes to be deleted, from the pallet; deleting connection lines extending from the nodes to be deleted from the pallet; and scrolling and optionally zooming out, in response to (i) one or more connection lines extending from the one or more nodes displayed on the pallet from which the nodes to be deleted are selected or (ii) one or more nodes on the pallet from which the nodes to be deleted are selected, the display on the view screen such that one or more nodes at connection destinations of the selected connection lines or one or more nodes at connection destinations of connection lines extending from the selected nodes are displayed within the view screen.

In an embodiment of the present invention, the pallet can be moved to an arbitrary position on the view screen.

In an embodiment of the present invention, the method can further include a step, executed by the computer, of: scrolling and optionally zooming out, in response to movement of the pallet to the arbitrary position on the view screen, the display on the view screen such that the one or more nodes at the connection destinations of the selected connection lines or the one or more nodes at the connection destinations of the connection lines extending from the selected nodes are displayed within the view screen.

In an embodiment of the present invention, the pallet can be floatingly displayed on the view screen.

In a second aspect according to the present invention, a computer for displaying nodes includes: view screen displaying means for displaying a plurality of nodes and respective connection lines between the nodes on a view screen; pallet displaying means for displaying, in response to selection of one or more nodes by a user on the view screen, the selected one or more nodes on a pallet; connection line drawing means for drawing connection lines extending from the one or more nodes displayed on the pallet, on the view screen; and node display controlling means for scrolling and optionally zooming out, in response to (i) selection of one or more connection lines extending from the one or more nodes displayed on the pallet or (ii) selection of one or more nodes on the pallet, a display on the view screen such that one or more nodes at connection destinations of the selected connection lines or one or more nodes at connection destinations of connection lines extending from the selected nodes are displayed within the view screen.

In an embodiment of the present invention, the node display controlling means can further scroll and optionally zoom out, in response to that one or more connection lines extending from the one or more nodes displayed on the pallet are further selected or that one or more nodes on the pallet are further selected, the display on the view screen such that one or more nodes at connection destinations of the further selected connection lines or one or more nodes at connection destinations of connection lines extending from the further selected nodes are displayed within the view screen.

In an embodiment of the present invention, the pallet displaying means can display, in response to detection of an action of adding one or more nodes on the view screen to the pallet, the connection line drawing means can further draw connection lines extending from the nodes added to the pallet, on the view screen, and the node display controlling means can further scroll and optionally zoom out, in response to (i) selection of one or more connection lines extending from the one or more nodes displayed on the pallet to which the nodes are added or (ii) one or more nodes on the pallet to which the nodes are added, the display on the view screen such that one or more nodes at connection destinations of the selected connection lines or one or more nodes at connection destinations of connection lines extending from the selected nodes are displayed within the view screen.

In an embodiment of the present invention, the pallet displaying means can further delete, in response to detection of an action of deleting one or more nodes displayed on the pallet, a display of the nodes to be deleted, from the pallet, the connection line drawing means can further delete connection lines extending from the nodes deleted from the pallet, and the node display controlling means can further scroll and optionally zoom out, in response to (i) selection of one or more connection lines extending from the one or more nodes displayed on the pallet from which the nodes are deleted or (ii) selection of one or more nodes on the pallet from which the nodes are deleted, the display on the view screen such that one or more nodes at connection destinations of the selected connection lines or one or more nodes at connection destinations of connection lines extending from the selected nodes are displayed within the view screen.

In an embodiment of the present invention, the pallet can be moved to an arbitrary position on the view screen.

In an embodiment of the present invention, the node display controlling means can further scroll and optionally zoom out, in response to movement of the pallet is to the arbitrary position on the view screen, the display on the view screen such that the one or more nodes at the connection destinations of the selected connection lines or the one or more nodes at the connection destinations of the connection lines extending from the selected nodes are displayed within the view screen.

In an embodiment of the present invention, the pallet can be floatingly displayed on the view screen.

In a third aspect according to the present invention, a computer program for displaying nodes causes a computer to execute the steps of the method in the first aspect according to the present invention.

A computer program of program code according to an embodiment of the present invention can be stored in one or more computer-readable recording/storage media or storage devices such as flexible disks, MOs, CD-ROMs, DVDs, BDs, hard disk devices, memory media connectable to USBs, ROMs, MRAMs, and RAMs. In order to store the computer program into such recording/storage media, the computer program can be downloaded from another computer (for example, a server computer) connected by a communication line, or can be copied from another recording/storage medium or storage device. Moreover, the computer program according to the embodiment of the present invention can be compressed or divided into a plurality of pieces to be stored into one or more recording/storage media or storage devices. Moreover, it should be noted that a computer program product according to an embodiment of the present invention can be provided in various modes, as a matter of course. For example, the computer program product according to the embodiment of the present invention can encompass the computer program of program code and a storage medium or storage device on which the computer program is recorded/stored.

It should be noted that the above-mentioned outline of the present invention does not cover all necessary features of the present invention, and combinations or sub-combinations of these components can also be covered by the present invention.

As a matter of course, various changes (for example, each hardware component of a computer used in an embodiment of the present invention is combined with a plurality of machines, and functions of the component are implemented while being distributed to the machines) can be easily conceived by those skilled in the art. Such changes are concepts that are naturally encompassed in the idea of the present invention. Note that these components are given as examples, and all the components are not necessarily essential to the present invention.

Moreover, the present invention can be implemented in the form of hardware, software, or a combination of hardware and software.

In the case of the combination of hardware and software, execution in a computer in which the computer program is installed can be given as a typical example. In this case, the computer program is loaded and executed on a memory of the computer, to thereby control the computer to execute processing according to the present invention. The computer program can be configured using a group of commands that can be expressed by an arbitrary language, code, or sign. Such a group of commands enables the computer to execute processing according to an embodiment of the present invention, after implementing a particular function directly or through any one or both of: 1. conversion into another language, code, or notation; and 2. copying to another medium.

Similarly, in the case of the combination of hardware and software, execution in a computer in which the computer program is installed can be given as a typical example. In this case, the computer program is loaded and executed on a memory of the computer, to thereby control the computer to execute processing according to the present invention. The computer program can be configured using a group of commands that can be expressed by any language, code, or notation. Such a group of commands enables the computer program to execute processing according to an embodiment of the present invention, after implementing a particular function directly or through any one or both of: 1. conversion into another language, code, or notation; and 2. copying to another medium.

In an embodiment of the present invention, a computer displays nodes of user's interest on a view screen, on a pallet, and, in response to that any of the connection lines extending from the nodes displayed on the pallet or any of the nodes displayed on the pallet is selected, the computer scrolls and optionally zooms out the display on the view screen such that the node at the connection destination of the selected connection line or the selected node is displayed within the view screen.

Consequently, according to the embodiment of the present invention, the nodes at the connection destinations of the nodes of user's interest can be brought into the view screen in such a manner that connection lines extending from the nodes of interest are pulled closer.

Moreover, according to the embodiment of the present invention, the nodes of user's interest on the pallet and the nodes at the connection destinations of the nodes of interest can be viewed on the view screen at the same time.

Moreover, according to the embodiment of the present invention, it is not necessary for a user to manually scroll and further zoom the nodes on the view screen, and hence the nodes at the connection destinations of the nodes of interest can be efficiently viewed.

An embodiment of the present invention is described below with reference to the drawings. Throughout the drawings, the same reference signs denote the same targets, unless otherwise defined. It should be noted that the embodiment of the present invention serves to describe preferable aspects of the present invention and that the scope of the present invention is not intended to be limited to configurations described in the embodiment.

FIG. 1 is a diagram illustrating an example computer 101, within a computer system, according to an embodiment of the present invention.

The computer (101) includes one or more CPUs (102) and a main memory (103), which are connected to a bus (104). The CPU (102) is preferably based on a 32-bit or 64-bit architecture. Examples of the CPU (102) can include: Core™ i series, Core™ 2 series, Atom™ series, Xeon® series, Pentium® series, and Celeron® series of Intel Corporation; A series, Phenom™ series, Athlon™ series, Turion™ series, and Sempron™ of Advanced Micro Devices, Inc. (AMD); and Power™ series of International Business Machines Corporation.

A display (106), for example, a liquid crystal display (LCD) can be connected to the bus (104) via a display controller (105). Moreover, the liquid crystal display (LCD) may be, for example, a touch panel display or a floating touch display. The display (106) can be used to display an object (for example, a view screen and a pallet according to the embodiment of the present invention) using an appropriate graphic interface, the object being displayed by an operation of software (for example, a computer program according to the embodiment of the present invention or various arbitrary computer programs running on the computer (101)) running on the computer (101). Moreover, the display (106) can output, for example, the view screen and the pallet screen according to the embodiment of the present invention.

A disk (108), for example, a hard disk or a solid state drive (SSD) can be optionally connected to the bus (104) via, for example, a SATA or IDE controller (107).

A drive (109), for example, a CD, DVD, or BD drive can be optionally connected to the bus (104) via, for example, the SATA or IDE controller (107).

A keyboard (111) and a mouse (112) can be optionally connected to the bus (104) via a peripheral device controller (110), for example, via a keyboard/mouse controller or a USB bus.

The disk (108) can store: operating systems such as Windows®, MacOS®, Android®, UNIX®, and Linux®; processing environments for Java® such as J2EE; Java® applications; Java® virtual machines (VM); a program for providing a JIT complier during execution of Java®; a computer program according to the embodiment of the present invention; other programs; and data such that they can be loaded onto the main memory (103).

The disk (108) may be built in the computer (101), may be connected to the computer (101) via a cable so as to be accessible by the computer (101), or may be connected to the computer (101) via a wired or wireless network so as to be accessible by the computer (101).

The drive (109) can be used, as needed, to install programs of, for example, an operating system and an application or a computer program according to the embodiment of the present invention from a CD-ROM, a DVD-ROM, or a BD to the disk (108).

A communication interface (114) is compliant with, for example, an Ethernet® protocol. The communication interface (114) is connected to the bus (104) via a communication controller (113), has a role of making a wired or wireless connection between the computer (101) and a communication line (115), and provides a network interface layer to a TCP/IP communication protocol of a communication function of an operating system of the computer (101). Note that the communication line can be, for example, a wireless LAN environment based on wireless LAN connection standards, a Wi-Fi LAN environment based on, for example, IEEE802.11a/b/g/n, or a mobile phone network environment (for example, a 3G, LTE, or 4G environment).

FIG. 2A to FIG. 2C, FIG. 3A to FIG. 3D, FIG. 4A to FIG. 4D, FIG. 5A to FIG. 5B, FIG. 6A to FIG. 6B, and FIG. 7A to FIG. 7B each illustrate an example in which nodes are displayed, according to the embodiment of the present invention.

First, terms used in the present invention are described below.

In the embodiment of the present invention, the term "view screen" refers to a window on a display of a computer (e.g., display 106 of computer 101). The view screen may be used for displaying: a plurality of nodes; and one or more connection lines respectively extending from the plurality of nodes or respectively extending to the plurality of nodes.

In the embodiment of the present invention, the term "node" refers to an individual element in a structure made of a plurality of elements connected to one another. The structure can be, for example, a tree structure, a network, a WWW or URI structure, linked open data (LOD), a route map, or an electrical circuit, but is not limited thereto.

In the embodiment of the present invention, the term "connection line" refers to an edge corresponding to a relation between nodes.

In the embodiment of the present invention, the term "pallet" refers to a window that is different from the view screen defined above and serves to display nodes that are selected by a user on the view screen. The "pallet" can be displayed on the view screen while partially or entirely overlapping therewith. Moreover, the "pallet" can be moved to an arbitrary position (i.e., to different positions) on the view screen. Moreover, the "pallet" can be floatingly displayed on the view screen. Moreover, the "pallet" can have a background color different from the background color of the view screen.

Figure 2A:
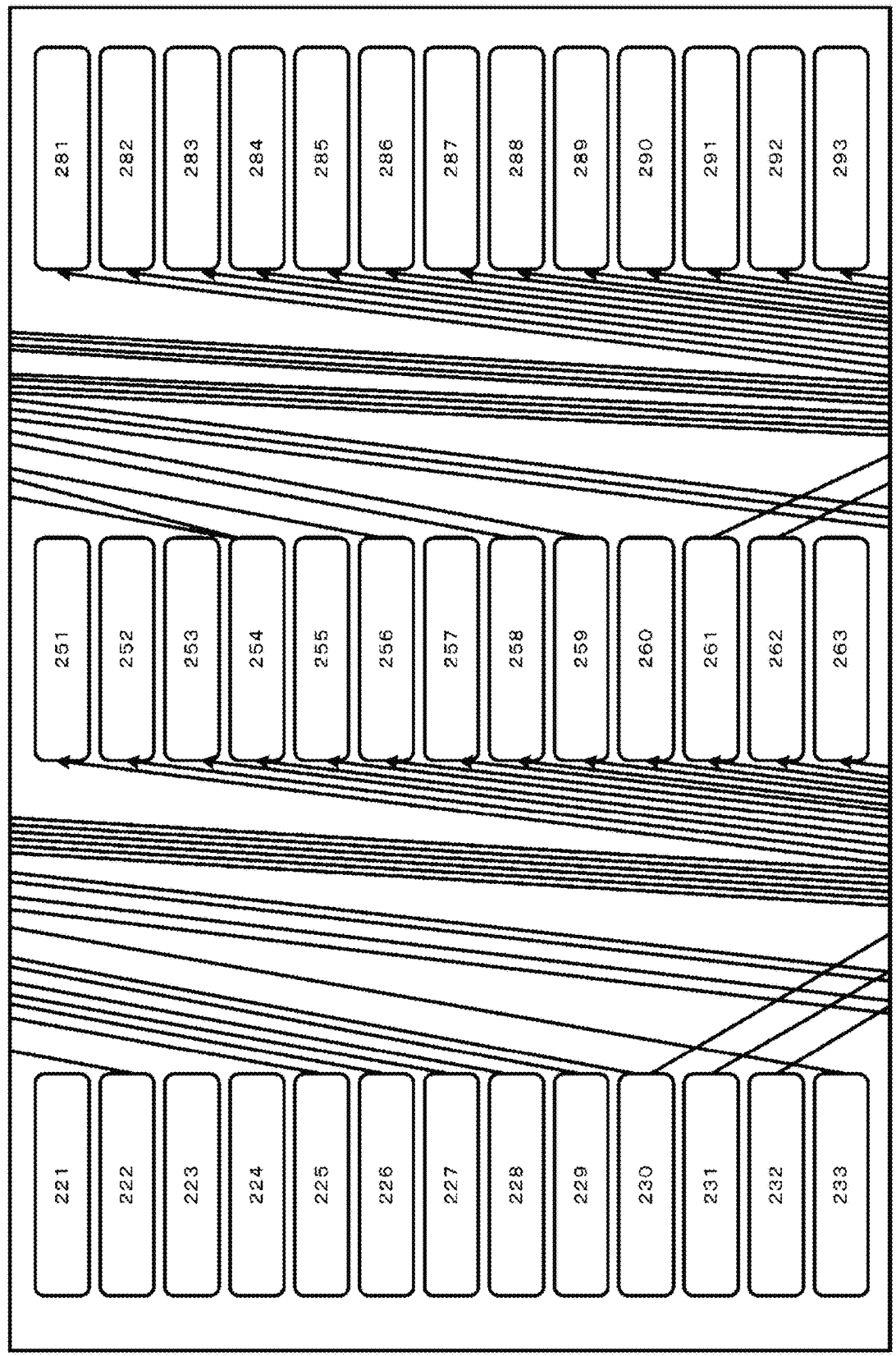
FIG. 2A illustrates an example view screen according to the embodiment of the present invention.
Figure 2B:
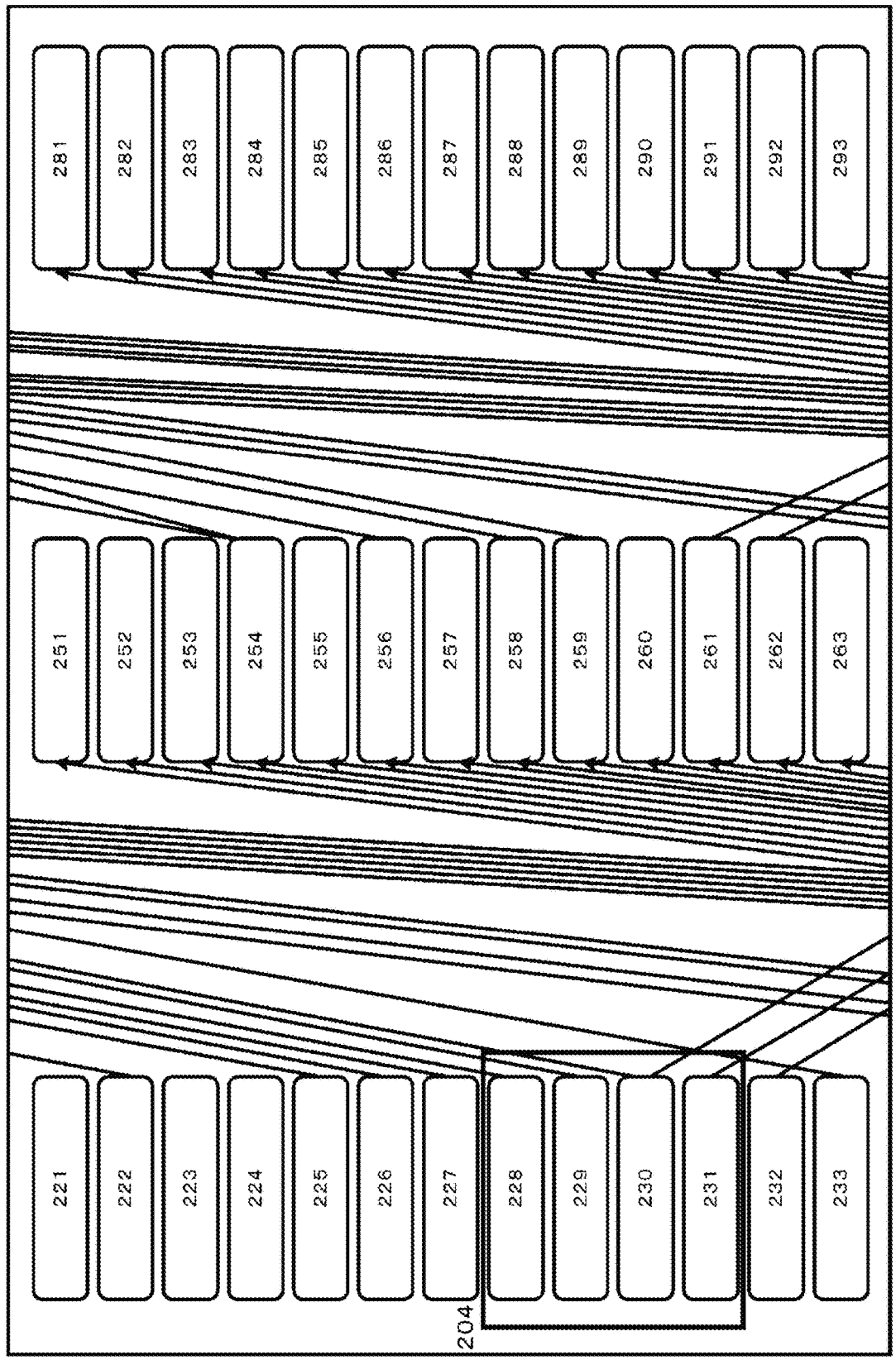
FIG. 2B illustrates an example aspect in which a user selects one or more nodes on the view screen illustrated in FIG. 2A, according to the embodiment of the present invention.
Figure 2C:
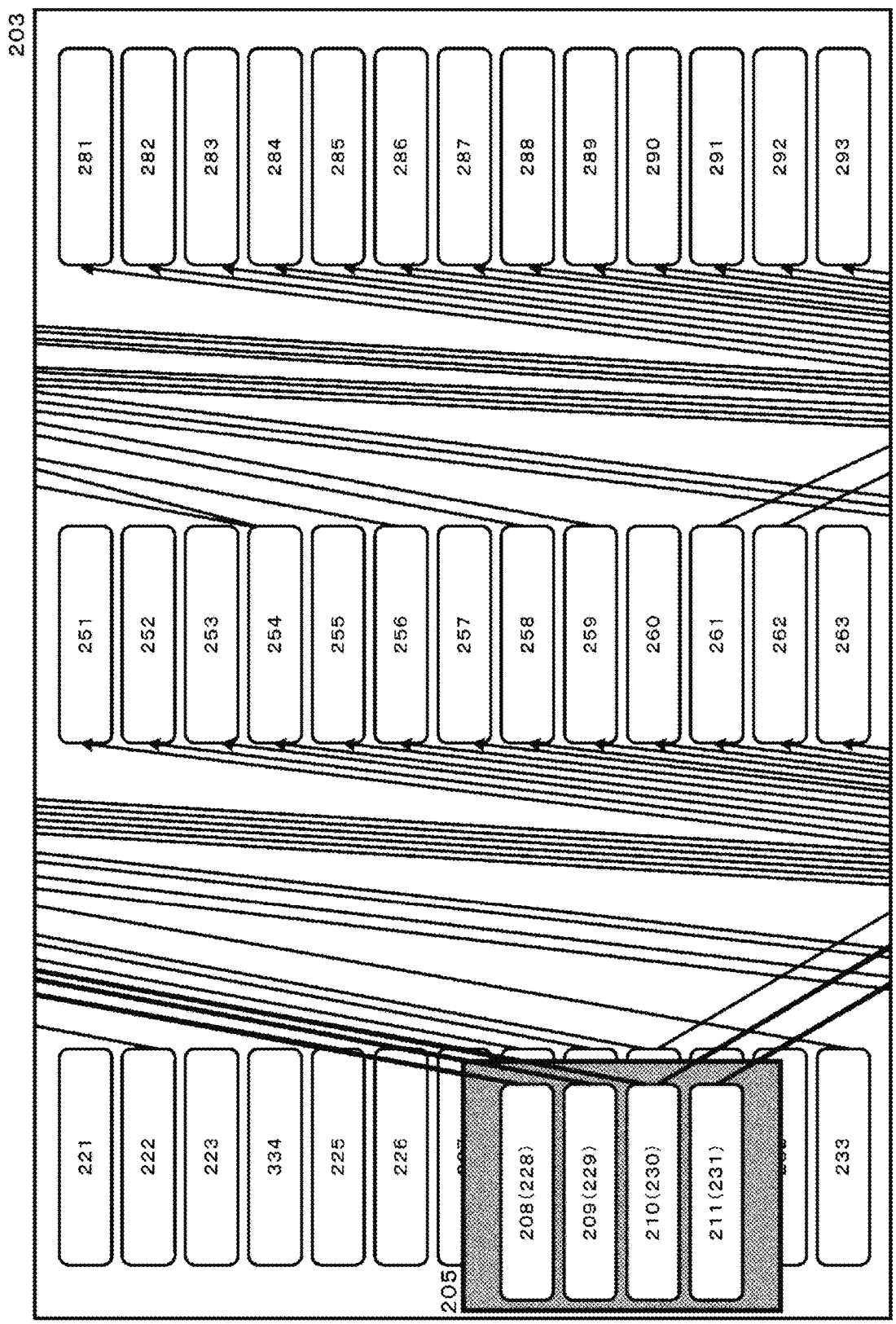
FIG. 2C illustrates an example aspect in which: the one or more nodes on the view screen that are selected by the user in FIG. 2B are displayed on a pallet; and connection lines extending from the nodes displayed on the pallet are drawn on the view screen, according to the embodiment of the present invention.

FIG. 2A to FIG. 2C illustrate respective example aspects for displaying a pallet (205) on a view screen (201).

FIG. 2A illustrates an example of the view screen (201) according to the embodiment of the present invention.

The computer (101) displays the view screen (201) illustrated in FIG. 2A.

The view screen (201) shows: a plurality of nodes (221 to 233, 251 to 263, 281 to 293); and one or more connection lines extending from each node, one or more connection lines extending to each node, or connection lines obtained by combining these connection lines. Thus, the plurality of nodes are displayed together with one or more connection lines, wherein each node of the displayed plurality of nodes is displayed as being in direct physical contact with at least one connection line of the at least one connection line, wherein the display (106) of the computer (101) comprises the view screen.

Note that, in each of FIG. 2A to FIG. 2C, FIG. 3A to FIG. 3D, FIG. 4A to FIG. 4D, FIG. 5A to FIG. 5B, FIG. 6A to FIG. 6B, and FIG. 7A to FIG. 7B, the number given to each node on the view screen is intended to facilitate identification of the node and description herein, and a difference in number between different drawings does not mean a difference in node. Moreover, even if the distance between a given node on the pallet and the node at the connection destination of the given node is different between different drawings, this difference does not make unknown a relation between the given node on the pallet and the node at the connection destination of the given node.

FIG. 2B illustrates an example aspect in which the user selects one or more nodes on the view screen (201) illustrated in FIG. 2A, according to the embodiment of the present invention.

The user selects the plurality of nodes (228, 229, 230, and 231) as nodes of interest. The user can select the plurality of nodes (228 to 231), for example, by surrounding the plurality of nodes (228, 229, 230, and 231) while clicking a mouse button or by surrounding a vicinity, that is, an outer periphery of the plurality of nodes (228, 229, 230, and 231) with the user's operation finger.

As shown on a view screen (202), the computer (101) can display a rectangle (204) indicating that the plurality of nodes (228 to 231) are selected, in the vicinity, that is the outer periphery of the plurality of nodes (228 to 231) selected by the user.

Thus, the computer (101) receives a selection of one or more nodes displayed on the view screen 202.

FIG. 2C illustrates an example aspect in which: the plurality of nodes (228 to 231) selected by the user in FIG. 2B are displayed on the pallet (205); and connection lines extending from nodes (208 to 211) displayed on the pallet (205) are drawn on the view screen, according to the embodiment of the present invention.

In response to the computer (101) receiving the selection of the plurality of nodes (228 to 231) by the user, as shown on a view screen (203), the computer (101) displays the nodes (208 to 211), as respective clones of the plurality of nodes (228 to 231), on the pallet (205). As shown on the view screen (203), the pallet (205) can be displayed on the nodes (228 to 231) selected by the user while partially or entirely overlapping therewith. Alternatively, the pallet (205) can be displayed at a position different from the positions of the nodes (228 to 231) selected by the user so as not to overlap with the selected nodes (228 to 231).

In one embodiment, the pallet (205) on the view screen (203) partially covers each node of the nodes (228)-(231) so that a covered portion of each covered node is not visible on the view screen and a remaining uncovered portion of each covered node is visible on the view screen. In one embodiment, the pallet (205) on the view screen (203) totally covers each node of the nodes (228)-(231) so that no portion of each covered node is visible on the view screen.

The computer (101) displays the nodes (208 to 211) as the respective clones of the nodes (228 to 231) selected by the user, on the pallet (205). The plurality of nodes (208 to 211) on the pallet respectively correspond to the nodes (228 to 231) that are selected by the user on the view screen (201).

Moreover, similarly to the connection lines extending from the nodes (228 to 231) on the view screen (201), the computer (101) draws connection lines extending from the plurality of nodes (208 to 211) on the pallet to the nodes at the connection destinations, on the view screen (201) beyond the pallet (205). That is, the computer (101) draws the connection lines extending from the plurality of nodes (208 to 211) on the pallet (205) (one connection line extending from the node (208), one connection line extending from the node (209), two connection lines extending from the node (210), and one connection line extending from the node (211)), on the view screen (203). In one embodiment, each extending connection line, from the nodes (208 to 211) on the pallet (205), corresponds to a respective connection line of the at least one connection line in direct physical contact with each node of the selected one or more nodes (228)-(231). In one embodiment, each extending connection line, from the nodes (208 to 211) on the pallet (205), is connected to a respective destination node that is not being currently displayed on the view screen (203).

Moreover, the computer (101) can display the connection lines extending from the plurality of nodes (208 to 211) on the pallet (205) in a different manner (for example, thicker lines or a different color (for example, a darker color)) from, for example, the connection lines on the view screen. Alternatively, the computer (101) can display the nodes and the connection lines on the view screen in a different manner (for example, thinner lines or a different color (for example, a lighter color)) from the initial display of the view screen.

FIG. 3A to FIG. 3D each illustrate a view screen displayed in response to the user sequentially selecting a connection line and a node from the nodes displayed on the pallet (205) illustrated in FIG. 2C, according to the embodiment of the present invention.

FIG. 3A illustrates an example aspect in which the user selects any of the connection lines extending from the nodes displayed on the pallet (205) illustrated in FIG. 2C, according to the embodiment of the present invention.

On a view screen (301), the user tries to select the connection line extending from the node (208) on the pallet (205) with, for example, the mouse or his/her operation finger (311).

In response to selection (311) of the connection line extending from the node (208) on the pallet (205), the computer (101) scrolls the display on the view screen (301) such that a node (352, see FIG. 3B) at the connection destination of the selected connection line (that is, the connection line extending from the node (208)) is displayed within the view screen (301), because the node (352) at the connection destination is not on the view screen (301) (that is, the node (352) at the connection destination exists in the non-displayed region).

FIG. 3B illustrates: an example aspect in which the display on the view screen is scrolled such that the node (352) at the connection destination of the connection line that is selected by the user in FIG. 3A is displayed on the view screen (302); and an example aspect in which the user further selects any of the connection lines extending from the nodes displayed on the pallet illustrated in FIG. 2C, according to the embodiment of the present invention.

A view screen (302) is a screen showing a result of scrolling the display on the view screen such that the node (352) at the connection destination of the connection line that is selected by the user in FIG. 3A is displayed on the view screen (302).

The computer (101) scrolls the display on the view screen such that the node (352) at the connection destination is displayed on the view screen (302).

The node (228) at the connection source on the view screen, of the connection line selected by the user is not displayed on the view screen (302).

As a result of scrolling the display on the view screen such that the node (352) at the connection destination is displayed, the user can view the node (208) on the pallet and the node (352) on the view screen at the connection destination thereof, on the screen at the same time.

Subsequently, on the view screen (302), the user tries to further select the lower connection line of the two connection lines extending from the node (210) on the pallet (205) with, for example, the mouse or the user's operation finger (312).

In response to selection (312) of the connection line extending from the node (210), the computer (101) scrolls the display on the view screen (302) such that a node (369, see FIG. 3C) at the connection destination of the further selected connection line (that is, the lower connection line extending from the node (210)) is displayed within the view screen (302), because the node (369) at the connection destination is not on the view screen (302) (that is, the node (369) at the connection destination exists in the non-displayed region).

Figure 3C:
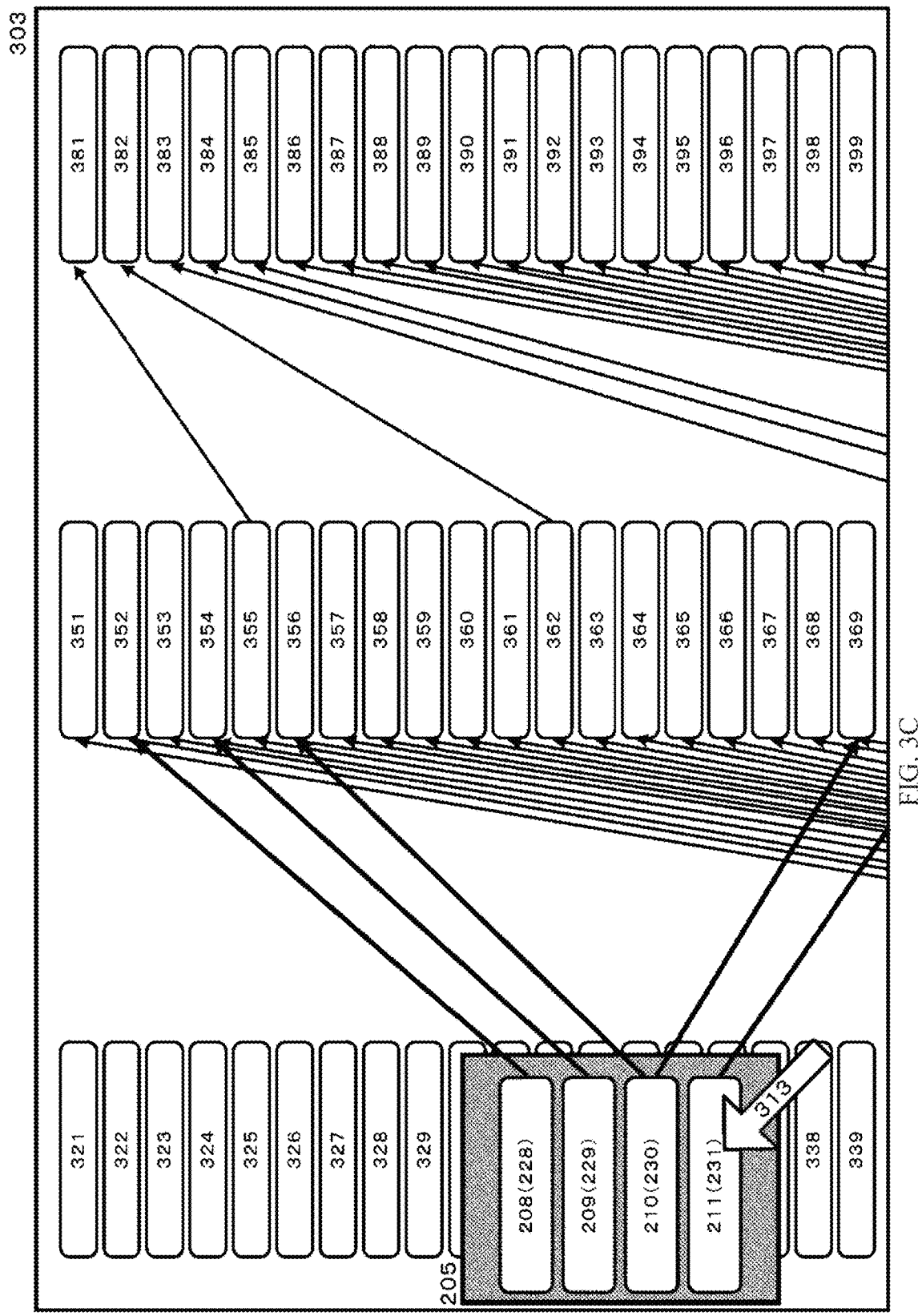
FIG. 3C illustrates: an example aspect in which the display on the view screen is scrolled such that the node at the connection destination of the connection line that is further selected by the user in FIG. 3B is displayed on the view screen; and an example aspect in which the user further selects any of the nodes on the pallet illustrated in FIG. 2C, according to the embodiment of the present invention.

FIG. 3C illustrates: an example aspect in which the display on the view screen is scrolled such that the node (369) at the connection destination of the connection line that is further selected by the user in FIG. 3B is displayed on the view screen; and an example aspect in which the user further selects any of the nodes on the pallet illustrated in FIG. 2C, according to the embodiment of the present invention.

A view screen (303) is a screen showing a result of: scrolling the display on the view screen such that the node (369) at the connection destination of the connection line that is further selected by the user in FIG. 3B is displayed on the view screen; and zooming out the display on the view screen such that both the node (352) at the connection destination of the connection line selected in FIG. 3A and the node (369) at the connection destination of the connection line that is selected by the user in FIG. 3B are displayed.

The computer (101) scrolls the display on the view screen such that the node (369) at the connection destination is displayed on the view screen (303), and zooms out the display on the view screen such that both the node (352) at the connection destination of the connection line selected in FIG. 3A and the node (369) at the connection destination of the connection line that is selected by the user in FIG. 3B are displayed on the view screen (303). Alternatively, the computer (101) can only scroll the display on the view screen such that the node (369) at the connection destination is displayed on the view screen (303), and can omit the zoom-out (accordingly, it is also possible that the node (352) at the connection destination of the connection line selected in FIG. 3A may not be displayed on the view screen).

The node (230) at the connection source of the connection line selected by the user is not displayed on the view screen (303).

As a result of scrolling the display on the view screen such that the node (369) at the connection destination is displayed, the user can view the node (210) on the pallet and the node (369) on the view screen at the connection destination thereof, on the screen at the same time.

Subsequently, the user tries to further select (313) the node (211) on the pallet (205) with, for example, the mouse or the user's operation finger.

In response to selection (313) of the node (211), the computer (101) scrolls the display on the view screen (303) such that a node (372, see FIG. 3D) at the connection destination of the further selected node (211) is displayed within the view screen (304), because the node (372) at the connection destination is not on the view screen (303) (that is, the node (372) at the connection destination exists in the non-displayed region).

Figure 3D:
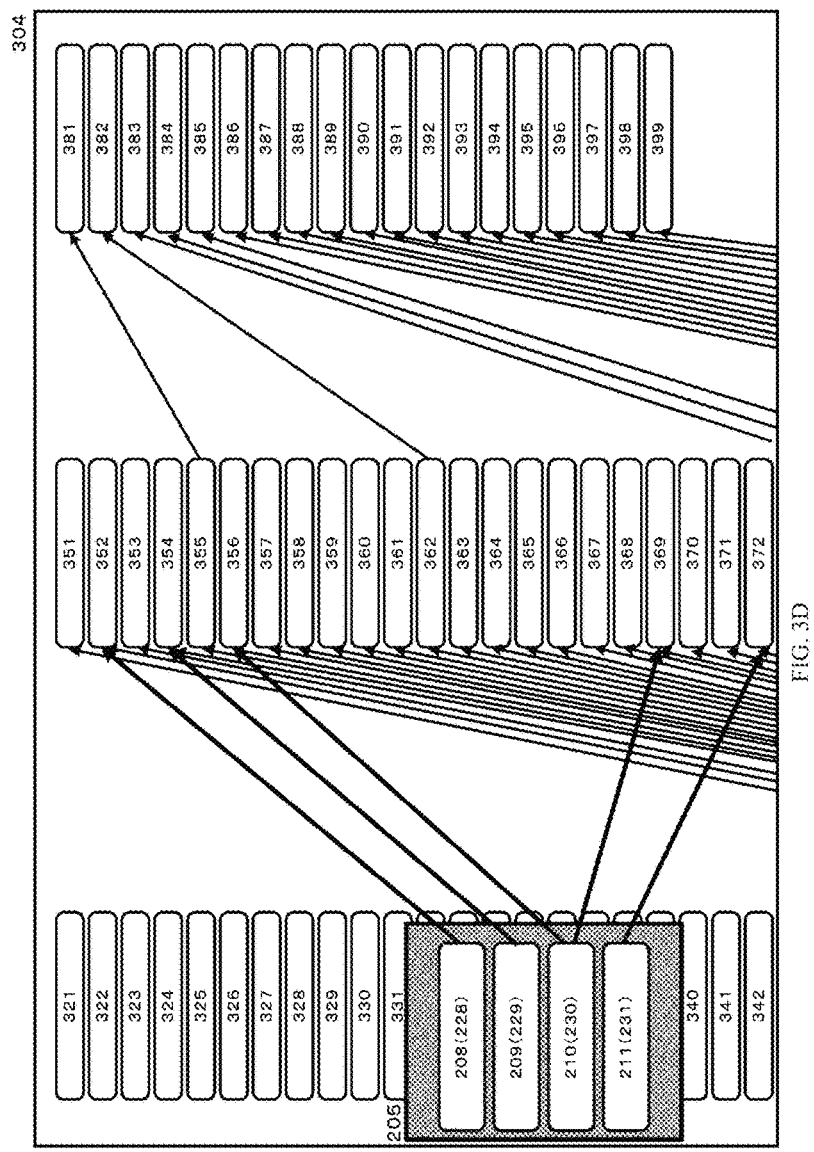
FIG. 3D illustrates an example aspect in which the display on the view screen is scrolled such that the node at the connection destination of the node that is further selected by the user in FIG. 3C is displayed on the view screen, according to the embodiment of the present invention.

FIG. 3D illustrates an example aspect in which the display on the view screen is scrolled such that the node at the connection destination (372) of the node that is further selected by the user in FIG. 3C is displayed on the view screen, according to the embodiment of the present invention.

A view screen (304) is a screen showing a result of: scrolling the display on the view screen such that the node (372) at the connection destination of the node that is selected by the user in FIG. 3C is displayed on the view screen; and zooming out the display on the view screen such that the node (352) at the connection destination of the connection line selected in FIG. 3A, the node (369) at the connection destination of the connection line that is selected by the user in FIG. 3B, and the node (372) at the connection destination of the node (211) selected in FIG. 3C are displayed.

The computer (101) scrolls the display on the view screen such that the node (372) at the connection destination is displayed on the view screen (304), and zooms out the display on the view screen such that the node (352) at the connection destination of the connection line selected in FIG. 3A, the node (369) at the connection destination of the connection line that is selected by the user in FIG. 3B, and the node (372) at the connection destination of the node (211) selected in FIG. 3C are displayed on the view screen (304). Alternatively, the computer (101) can only scroll the display on the view screen such that the node (372) at the connection destination is displayed on the view screen (304), and can omit the zoom-out (accordingly, it is also possible that the node (352) at the connection destination of the connection line selected in FIG. 3A may not be displayed on the view screen).

The node (231) at the connection source of the connection line selected by the user is not displayed on the view screen (304).

As a result of scrolling the display on the view screen such that the node (372) at the connection destination is displayed, the user can view the node (211) on the pallet and the node (372) on the view screen at the connection destination thereof, on the screen at the same time.

Thus in one embodiment, the computer (101) scrolls and zooms out the view screen, after which each respective destination node (352, 354, 356, 369, etc.), connected by the extending lines to nodes (208)-(211) on the pallet (205), is displayed in the view screen (303) together with the pallet (205) and the extending connection lines extending from each node of the nodes (208)-(211) displayed on the pallet (205).

FIG. 4A to FIG. 4D each illustrate a view screen displayed in response to the user sequentially selecting a node and a connection line from the nodes displayed on the pallet (205) illustrated in FIG. 2C, according to the embodiment of the present invention.

Figure 4A:
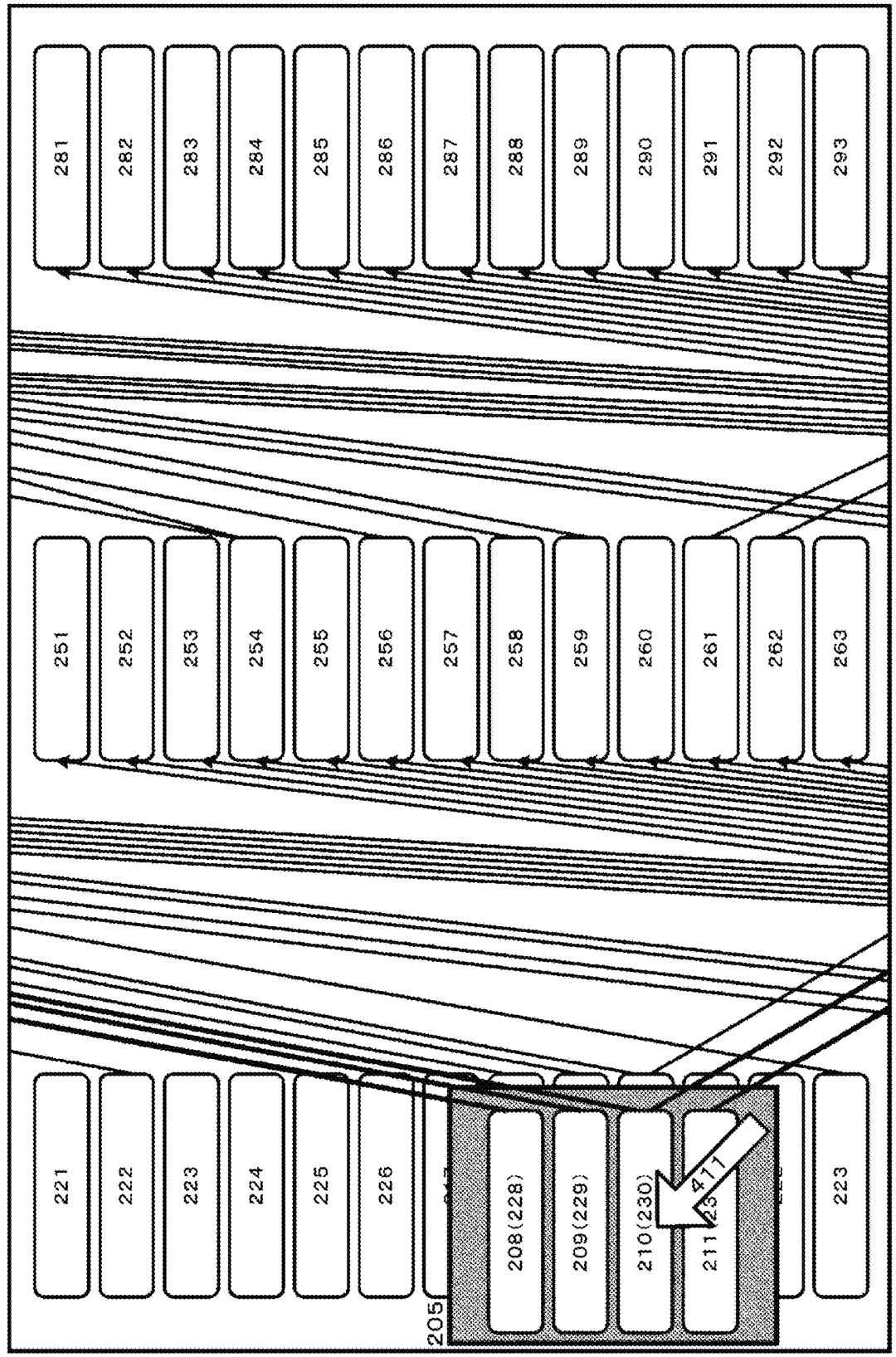
FIG. 4A illustrates an example aspect in which the user selects any of the nodes on the pallet illustrated in FIG. 2C, according to the embodiment of the present invention.

FIG. 4A illustrates an example aspect in which the user selects any of the nodes on the pallet illustrated in FIG. 2C, according to the embodiment of the present invention.

On the view screen (301), the user selects the node (210) on the pallet (205) with, for example, the mouse or the user's operation finger (411).

In response to selection (411) of the node (210) on the pallet (205), the computer (101) scrolls and zooms out the display on a view screen (401) such that two nodes (456 and 469, see FIG. 4B) at the connection destinations of the selected node (210) are displayed within the view screen (402), because the two nodes (456 and 469) at the connection destinations are not on the view screen (401) (that is, the two nodes (456 and 469) at the connection destinations exist in the non-displayed region).

Figure 4B:
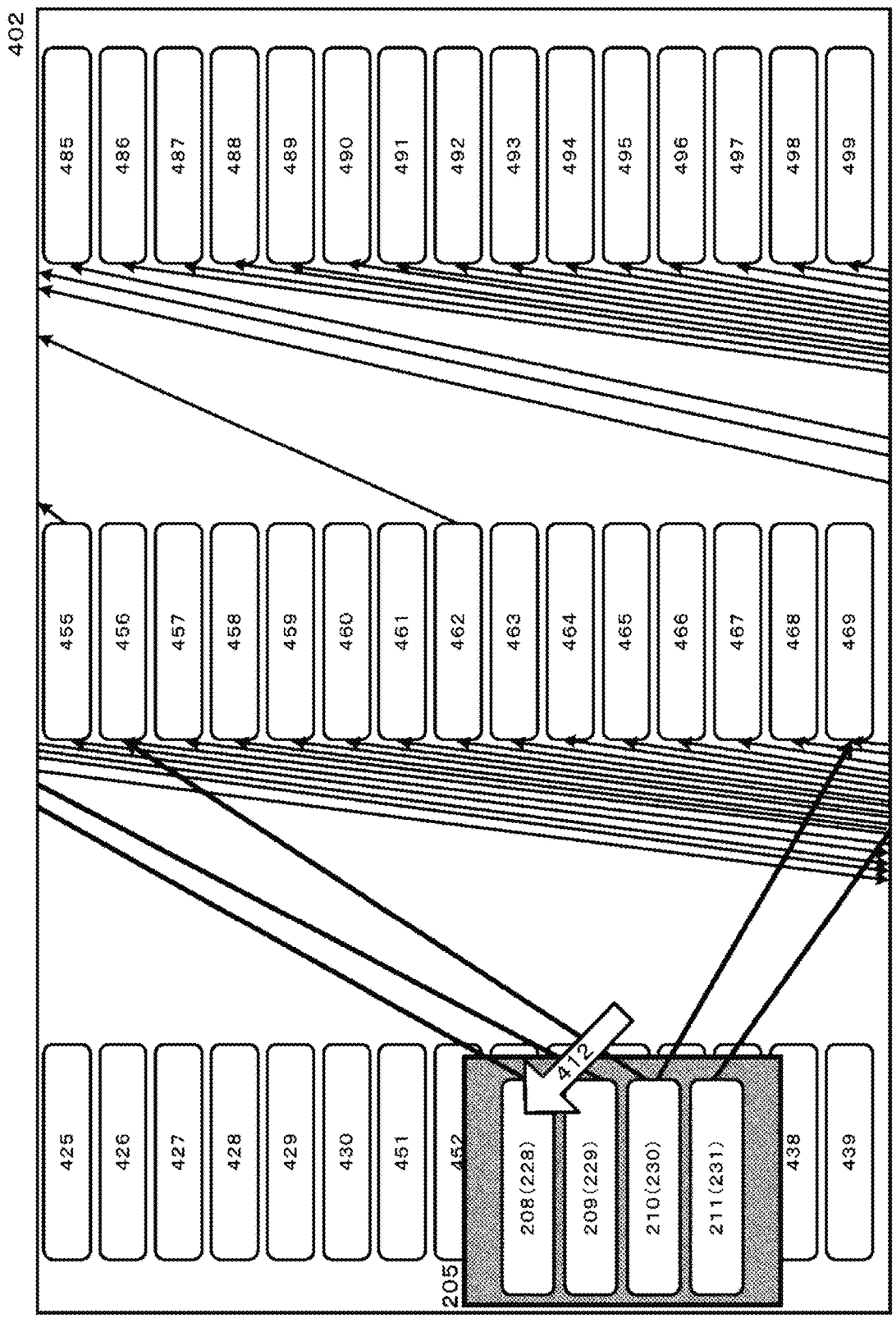
FIG. 4B illustrates: an example aspect in which the display on the view screen is scrolled such that the nodes at the connection destination of the node that is selected by the user in FIG. 4A are displayed on the view screen; and an example aspect in which the user further selects any of the nodes on the pallet illustrated in FIG. 2C, according to the embodiment of the present invention.

FIG. 4B illustrates: an example aspect in which the display on the view screen is scrolled such that the nodes at the connection destination of the node that is selected by the user in FIG. 4A are displayed on the view screen; and an example aspect in which the user further selects any of the nodes on the pallet illustrated in FIG. 2C, according to the embodiment of the present invention.

A view screen (402) is a screen showing a result of scrolling and zooming out the display on the view screen such that the two nodes (456 and 469) at the connection destinations of the node (210) that is selected by the user in FIG. 4A are displayed on the view screen.

The computer (101) scrolls and zooms out the display on the view screen such that the two nodes (456 and 469) at the connection destinations are displayed on the view screen (402).

The node (230) on the view screen corresponding to the node (210) selected by the user is not displayed on the view screen (402).

As a result of scrolling the display on the view screen such that the two nodes (456 and 469) at the connection destinations are displayed, the user can view the node (210) on the pallet and the two nodes (456 and 469) on the view screen at the connection destinations thereof, on the screen at the same time.

Subsequently, the user tries to further select (412) the node (208) on the pallet (205) with, for example, the mouse or the user's operation finger.

In response to selection (412) of the node (208), the computer (101) scrolls the display on the view screen (402) such that a node (452, see FIG. 4C) at the connection destination of the further selected node (208) is displayed within the view screen (403), because the node (452) at the connection destination is not on the view screen (402) (that is, the node (452) at the connection destination exists in the non-displayed region).

Figure 4C:
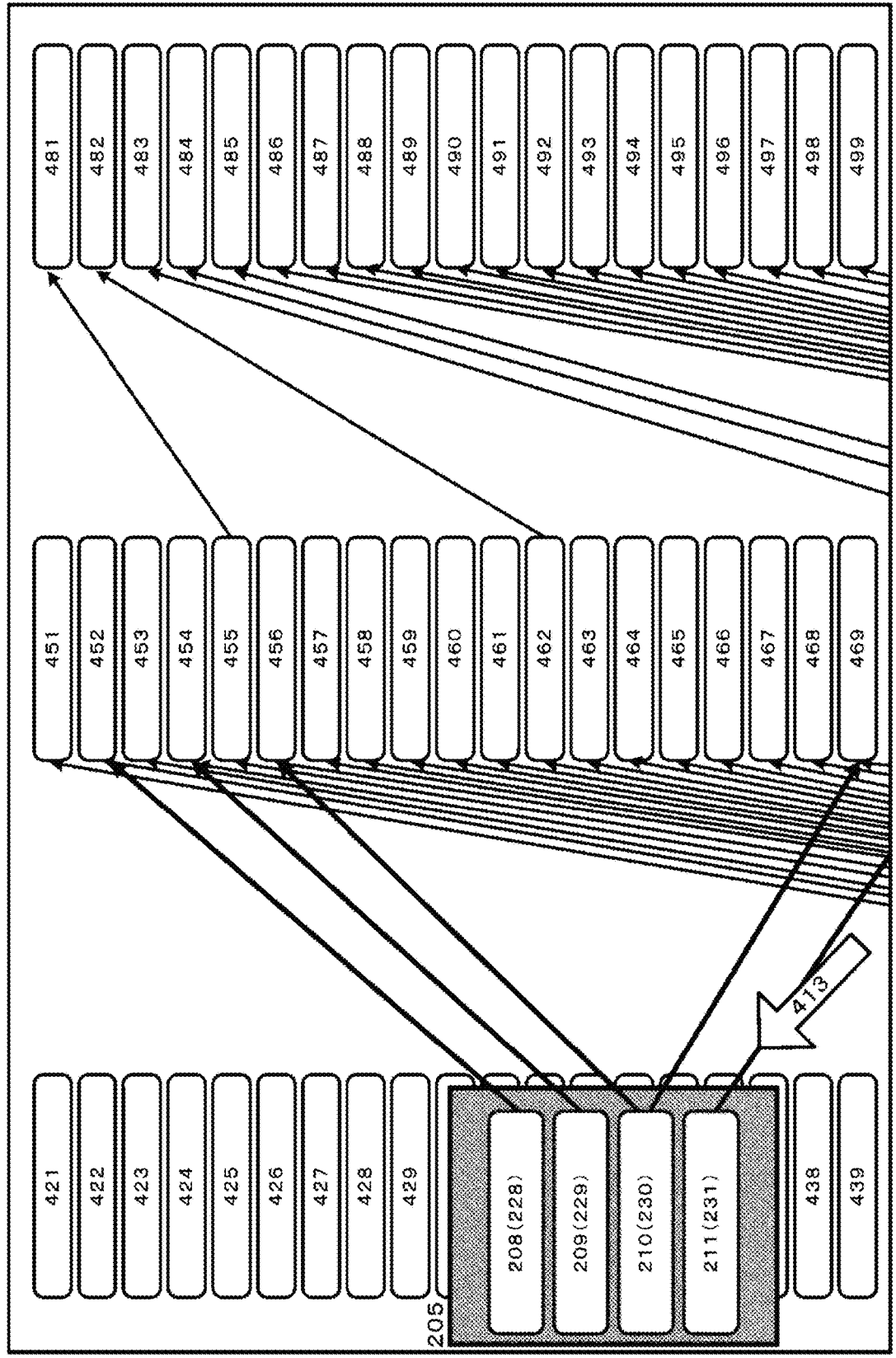
FIG. 4C illustrates: an example aspect in which the display on the view screen is scrolled and zoomed out such that the node at the connection destination of the node that is further selected by the user in FIG. 4B is displayed on the view screen; and an example aspect in which the user further selects any of the connection lines extending from the nodes displayed on the pallet illustrated in FIG. 2C, according to the embodiment of the present invention.

FIG. 4C illustrates: an example aspect in which the display on the view screen is scrolled and zoomed out such that the node at the connection destination of the node that is further selected by the user in FIG. 4B is displayed on the view screen; and an example aspect in which the user further selects any of the connection lines extending from the nodes displayed on the pallet illustrated in FIG. 2C, according to the embodiment of the present invention.

A view screen (403) is a screen showing a result of: scrolling the display on the view screen such that the node (452) at the connection destination of the node (208) that is further selected by the user in FIG. 4B is displayed on the view screen (403); and zooming out the display on the view screen such that both of the node (469) at the connection destination of the node (210) selected in FIG. 4A and the node (452) at the connection destination of the node (208) that is selected by the user in FIG. 4B are displayed.

The computer (101) scrolls the display on the view screen such that the node (452) at the connection destination is displayed on the view screen (403), and zooms out the display on the view screen such that the node (469) at the connection destination of the node (210) selected in FIG. 4A and the node (452) at the connection destination of the node (208) that is selected by the user in FIG. 4B are displayed on the view screen (403). Alternatively, the computer (101) can only scroll the display on the view screen such that the node (452) at the connection destination is displayed on the view screen (403), and can omit the zoom-out (accordingly, it is also possible that the node (469) at the connection destination of the node (210) selected in FIG. 4A may not be displayed on the view screen).

The node (228) on the view screen corresponding to the node (208) selected by the user is not displayed on the view screen (403).

As a result of scrolling the display on the view screen such that the node (452) at the connection destination is displayed, the user can view the node (208) on the pallet and the node (452) on the view screen at the connection destination thereof, on the screen at the same time.

Subsequently, the user selects (413) the connection line extending from the node (211) on the pallet (205) with, for example, the mouse or the user's operation finger.

In response to the connection line extending from the node (211) being further selected (413), the computer (101) scrolls the display on the view screen (403) such that a node (472, see FIG. 4D) at the connection destination of the further selected connection line (that is, the connection line extending from the node (211)) is displayed within the view screen (403), because the node (472) at the connection destination is not on the view screen (403) (that is, the node (472) at the connection destination exists in the non-displayed region).

Figure 4D:
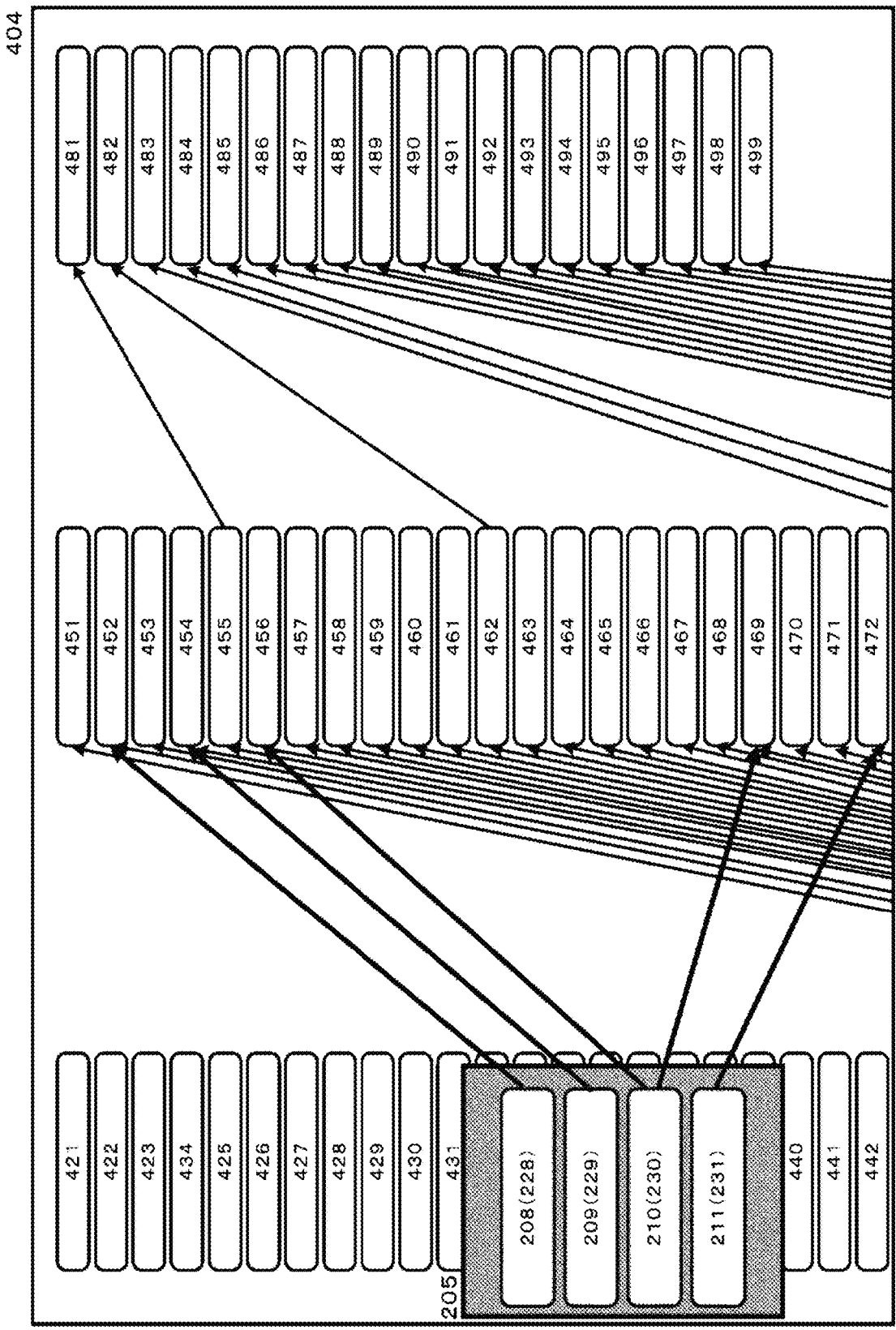
FIG. 4D illustrates an example aspect in which the display on the view screen is scrolled such that the node at the connection destination of the connection line that is further selected by the user in FIG. 4C is displayed on the view screen, according to the embodiment of the present invention.

FIG. 4D illustrates an example aspect in which the display on the view screen is scrolled such that the node at the connection destination of the connection line that is further selected by the user in FIG. 4C is displayed on the view screen, according to the embodiment of the present invention.

A view screen (404) is a screen showing a result of: scrolling the display on the view screen such that the node (472) at the connection destination of the connection line that is selected by the user in FIG. 4C is displayed on the view screen; and zooming out the display on the view screen such that the node (469) at the connection destination of the node (210) selected in FIG. 4A, the node (452) at the connection destination of the node (208) that is selected by the user in FIG. 4B, and the node (472) at the connection destination of the connection line selected in FIG. 4C are displayed.

The computer (101) scrolls the display on the view screen such that the node (472) at the connection destination is displayed on the view screen (404), and zooms out the display on the view screen such that the node (469) at the connection destination of the node (210) selected in FIG. 4A, the node (452) at the connection destination of the node (208) that is selected by the user in FIG. 4B, and the node (472) at the connection destination of the connection line selected in FIG. 4C are displayed on the view screen (404). Alternatively, the computer (101) can only scroll the display on the view screen such that the node (472) at the connection destination is displayed on the view screen (404), and can omit the zoom-out (accordingly, it is also possible that the node (452) at the connection destination of the node (208) selected in FIG. 4B may not be displayed on the view screen).

The node (231) at the connection source of the connection line selected by the user is not displayed on the view screen (404).

As a result of scrolling the display on the view screen such that the node (472) at the connection destination is displayed, the user can view the node (211) on the pallet and the node (472) on the view screen at the connection destination thereof, on the screen at the same time.

Figure 5A:
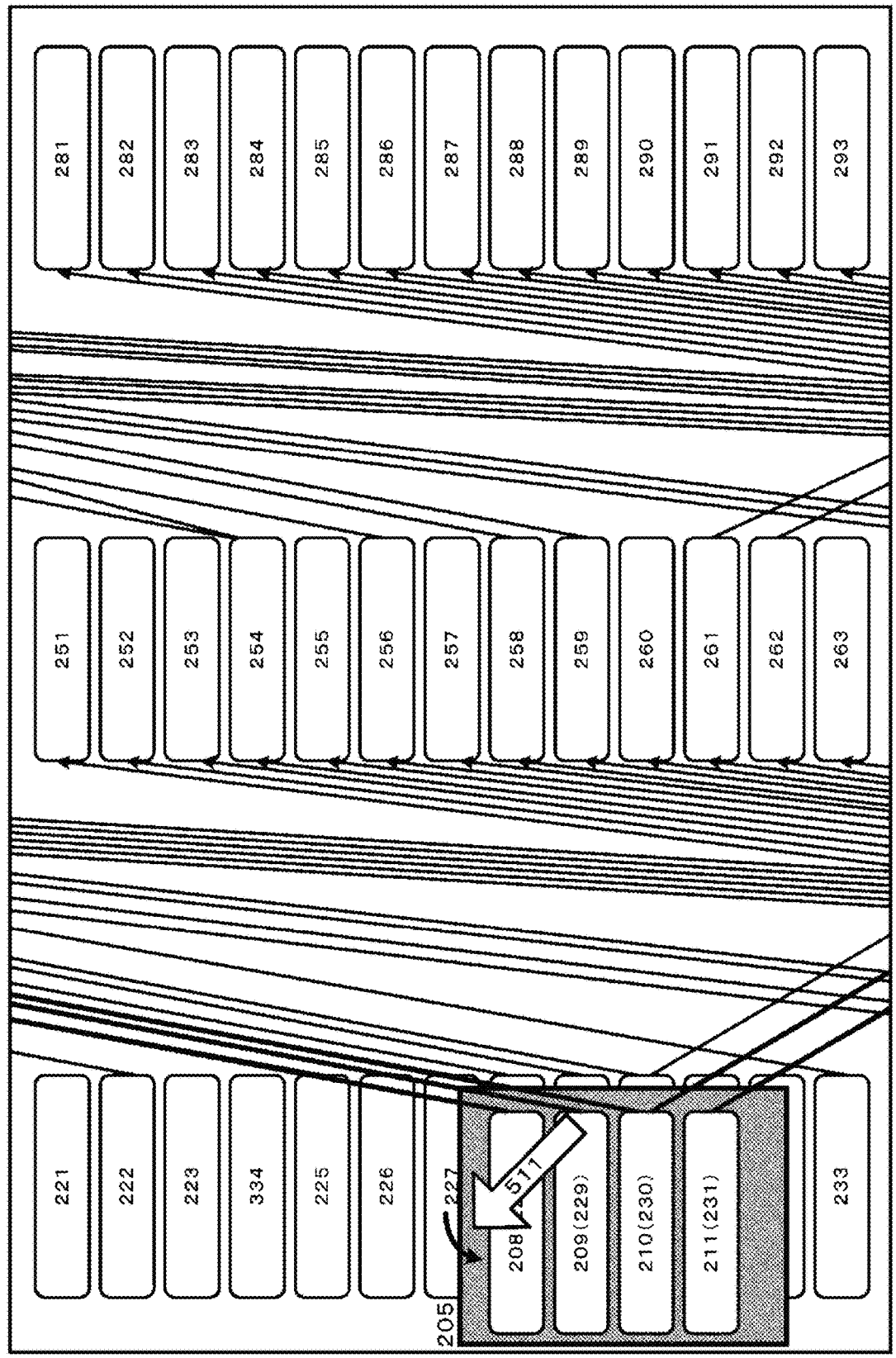
FIG. 5A illustrates an example aspect in which any of the nodes displayed on the view screen is added to the pallet illustrated in FIG. 2C, according to the embodiment of the present invention.
Figure 5B:
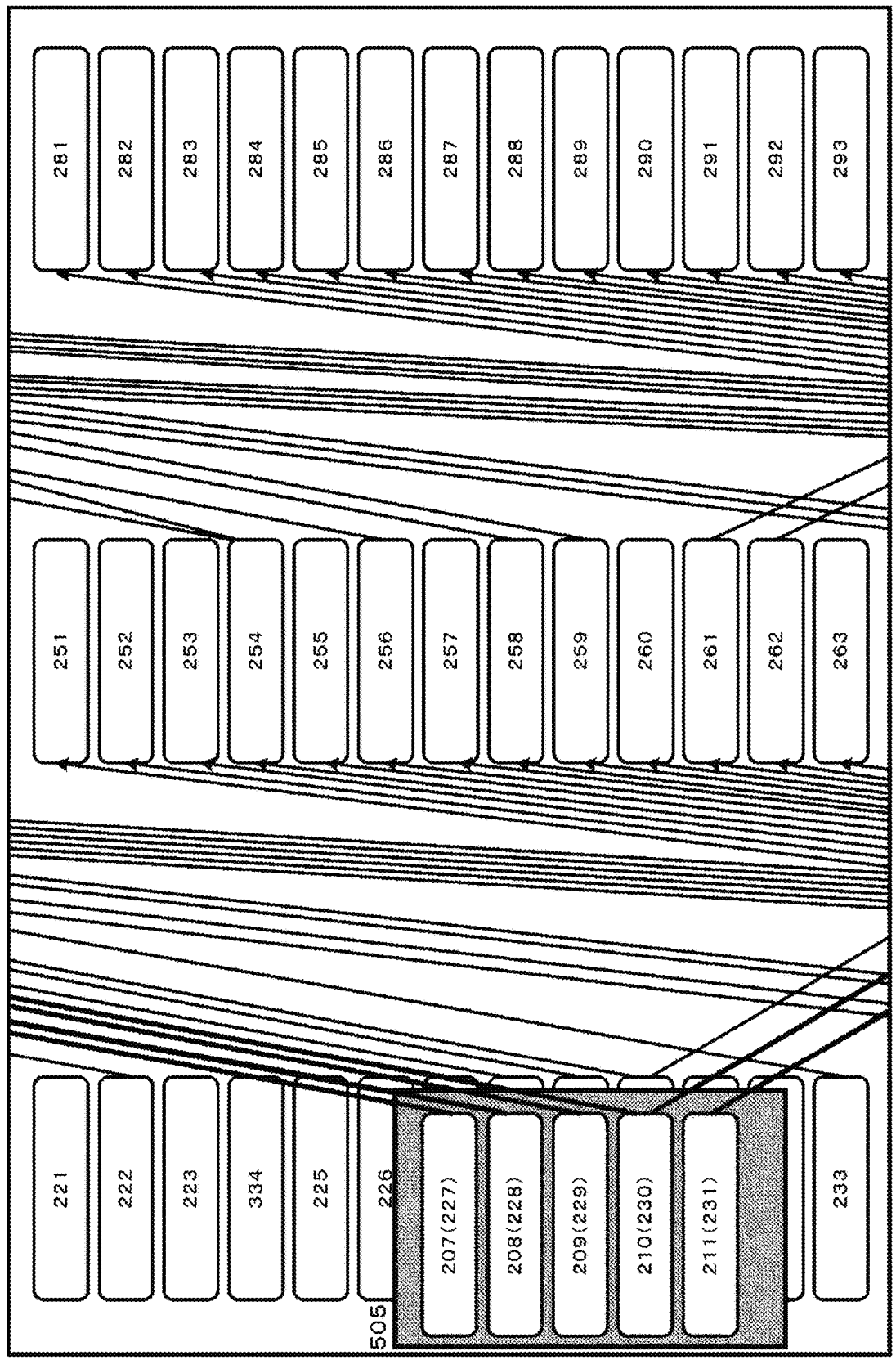
FIG. 5B illustrates: an example aspect in which the pallet after the node is added to the pallet in FIG. 5A is displayed; and an example aspect in which connection lines extending from the pallet after the node is added are drawn on the view screen, according to the embodiment of the present invention.

FIG. 5A and FIG. 5B illustrate an example aspect in which a node is added to the pallet illustrated in FIG. 2C, according to the embodiment of the present invention.

FIG. 5A illustrates an example aspect in which any of the nodes displayed on the view screen is added to the pallet illustrated in FIG. 2C, according to the embodiment of the present invention.

A view screen (501) is the same as the view screen (203) illustrated in FIG. 2C.

The user selects the node (227) on the view screen (501) with, for example, the mouse or the user's operation finger, and drags (511) the node (227) onto the pallet (205).

The computer (101) detects the drag (511) of the node (227) onto the pallet (205).

In response to detection of the drag (511) of the node (227) onto the pallet (205), the computer (101) updates the display of the pallet (205) in order to display the node added to the pallet (205) (505, see FIG. 5B).

FIG. 5B illustrates: an example aspect in which the pallet after the node is added to the pallet in FIG. 5A is displayed; and an example aspect in which connection lines extending from the pallet after the node is added are drawn on the view screen, according to the embodiment of the present invention.

A node (207) corresponding to the node (227) on the view screen (501) is added on the pallet (505).

The computer (101) draws the connection line, extending from the node (207) on the pallet (505) on the view screen (502), wherein the connection line extending from the node (207) is connected to one destination node that is not being currently displayed on the view screen.

The computer (101) scrolls and optionally zooms the view screen (502), after which the one destination node is displayed in the view screen (not shown) together with the pallet (505), the one connection line extending from the node (207) and the other extending connection lines extending from the nodes (208)-(211) on the pallet.

Figure 6A:
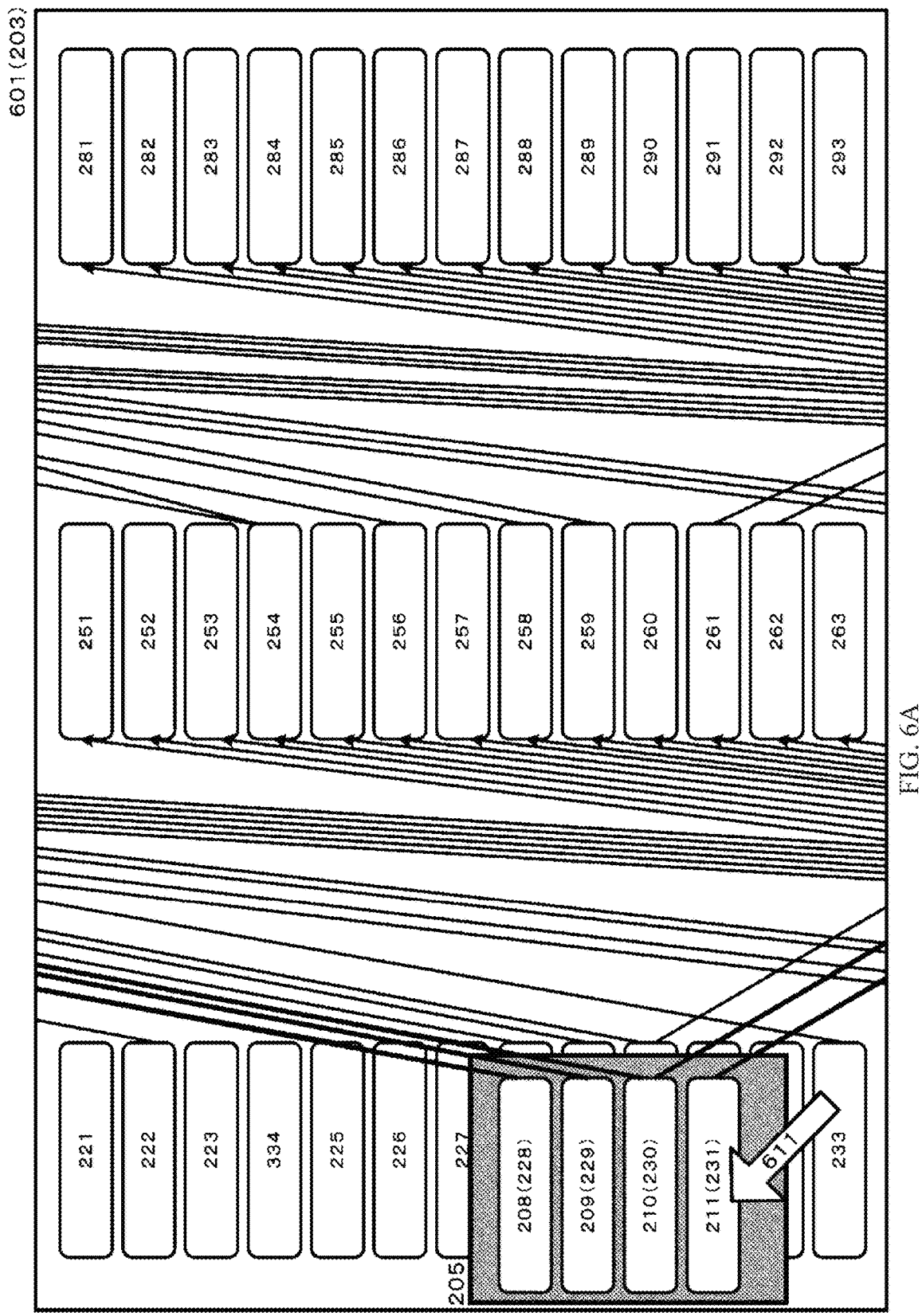
FIG. 6A illustrates an example aspect in which a node is deleted from the pallet illustrated in FIG. 2C, according to the embodiment of the present invention.
Figure 6B:
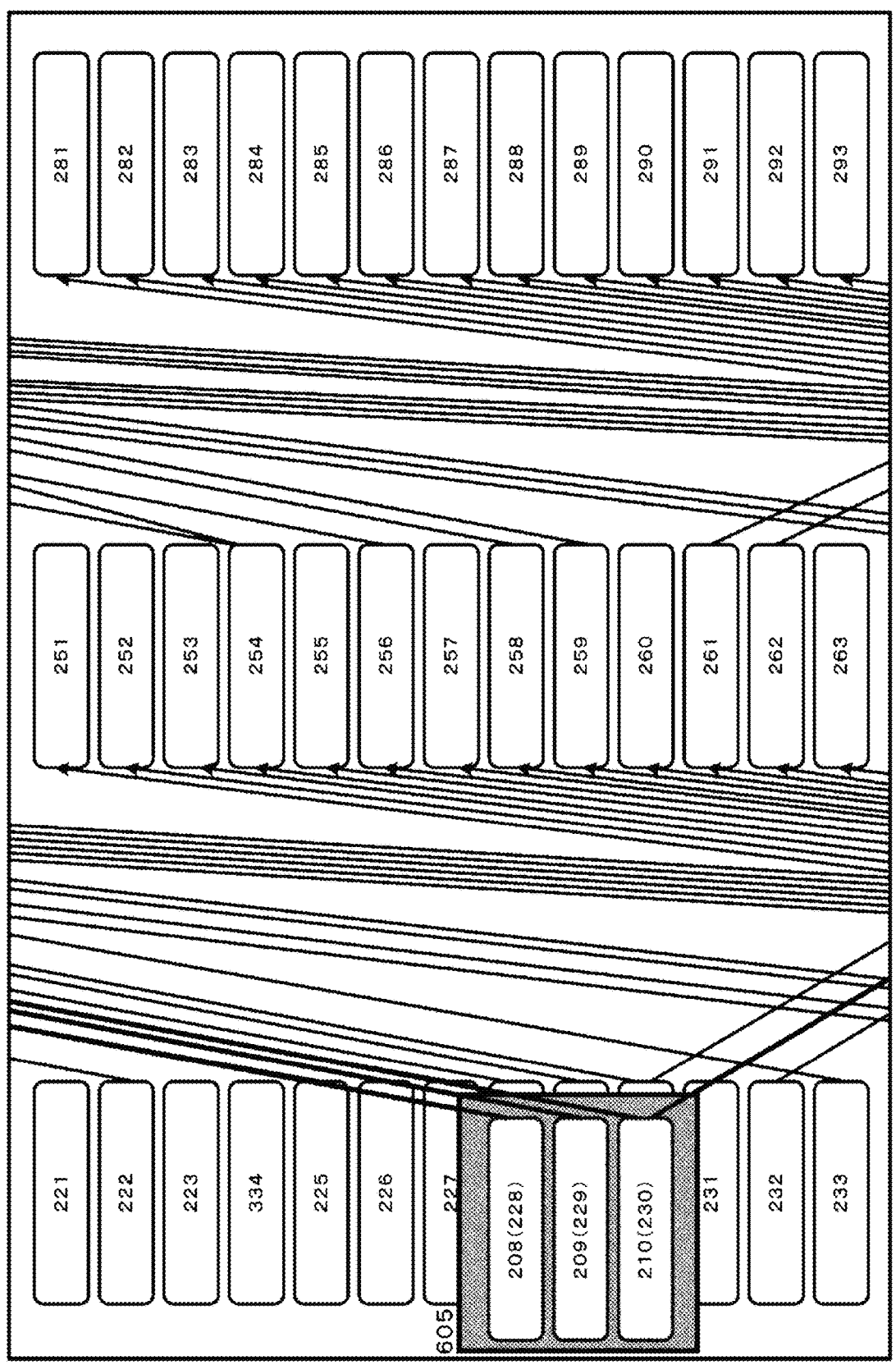
FIG. 6B illustrates: an example aspect in which the pallet after the node is deleted from the pallet in FIG. 6A is displayed; and an example aspect in which connection lines extending from the pallet after the node is deleted are drawn on the view screen, according to the embodiment of the present invention.

FIG. 6A and FIG. 6B illustrate an example aspect in which a node is deleted from the pallet illustrated in FIG. 2C, according to the embodiment of the present invention.

FIG. 6A illustrates an example aspect in which a node is deleted from the pallet illustrated in FIG. 2C, according to the embodiment of the present invention.

A view screen (601) is the same as the view screen (203) illustrated in FIG. 2C.

The user selects (611) the node (211) on the pallet (205) with, for example, the mouse or the user's operation finger, and drags the node (211) onto the view screen (601).

The computer (101) detects the drag (611) of the node (211) onto the view screen (601).

In response to detection of the drag (611) of the node (211) onto the view screen (601), the computer (101) updates the display of the pallet (205) in order to delete the display of the node deleted from the pallet (205) (605, see FIG. 6B).

FIG. 6B illustrates: an example aspect in which the pallet after the node is deleted from the pallet in FIG. 6A is displayed; and an example aspect in which connection lines extending from the pallet after the node is deleted are drawn on the view screen, according to the embodiment of the present invention.

The display of the node (211) dragged from the pallet (205) is deleted on the pallet (605).

The computer (101) deletes the connection line extending from the node (211), on the pallet (605).

Figure 7B:
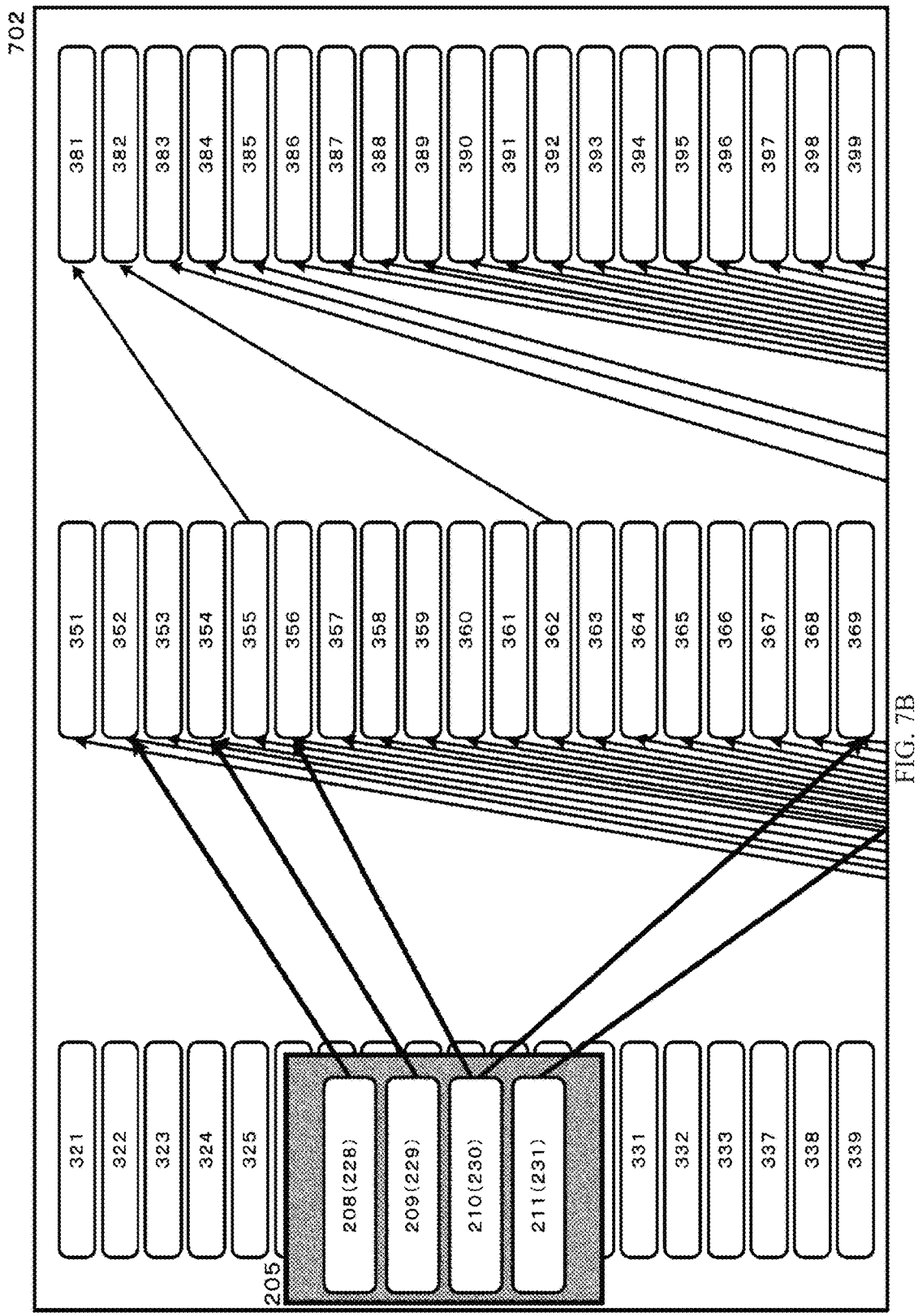
FIG. 7B illustrates: an example aspect in which the pallet after the pallet is moved on the view screen in FIG. 7A is displayed; and an example aspect in which connection lines extending from the pallet after the movement are drawn on the view screen, according to the embodiment of the present invention.

FIG. 7A and FIG. 7B illustrate an example aspect in which the pallet illustrated in FIG. 2C is moved, according to the embodiment of the present invention.

FIG. 7A illustrates an example aspect in which the pallet is moved on the view screen, according to the embodiment of the present invention.

A view screen (701) is the same as the view screen (303) illustrated in FIG. 3C.

The user wants to add a node (331) on the view screen (701) to the pallet (205). However, the node (331) is located under the pallet (205), and hence the user cannot select the node (331).

In this case, in order to move the floatingly displayed pallet (205) to an arbitrary position on the view screen (701) at which the node (331) can be seen, the user selects another position (for example, a space portion other than the nodes) on the pallet (205) with, for example, the mouse or the user's operation finger. Then, the user moves (701) the pallet (205) to the other position on the view screen at which the node (331) can be seen (see a view screen (702) illustrated in FIG. 7B).

The computer (101) detects the above-mentioned selection and movement of the pallet (205).

In response to the movement of the pallet (205) on the view screen (701), the computer (101) displays the pallet (205) at the other position after the movement (see FIG. 7B).

FIG. 7B illustrates: an example aspect in which the pallet after the pallet is moved on the view screen in FIG. 7A is displayed; and an example aspect in which connection lines extending from the pallet after the movement are drawn on the view screen, according to the embodiment of the present invention.

The pallet (205) at the other position after the movement is displayed on the view screen (702). Moreover, the node (331) that the user wants to add to the pallet (205) can be seen on the view screen (702).

Subsequently, the user performs an operation of adding the node (331) to the pallet (205). For the operation and process of adding the node to the pallet, see FIG. 5A and FIG. 5B.

Figure 8A:
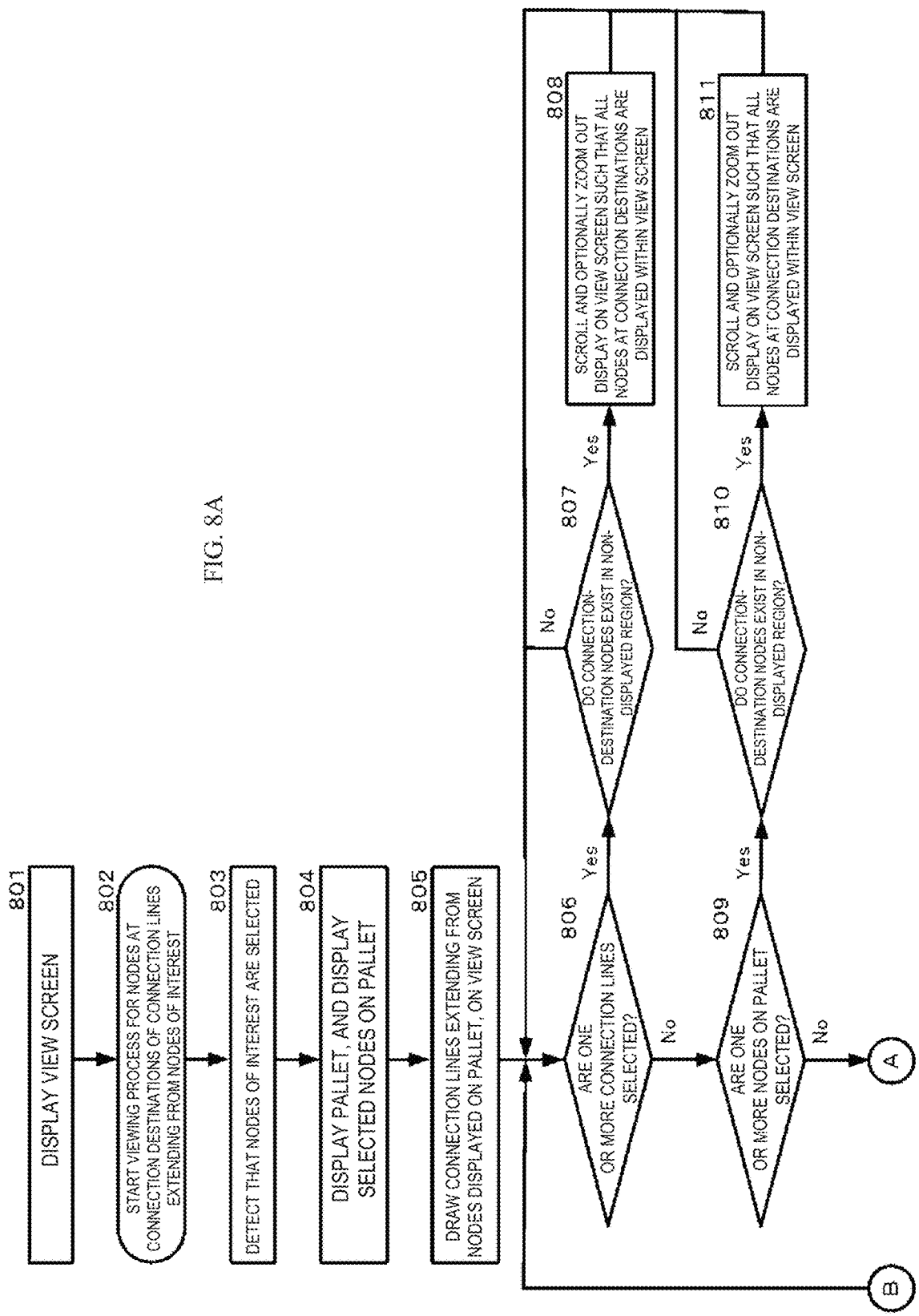
FIG. 8A illustrates an example flowchart for displaying nodes according to the embodiment of the present invention.
Figure 8B:
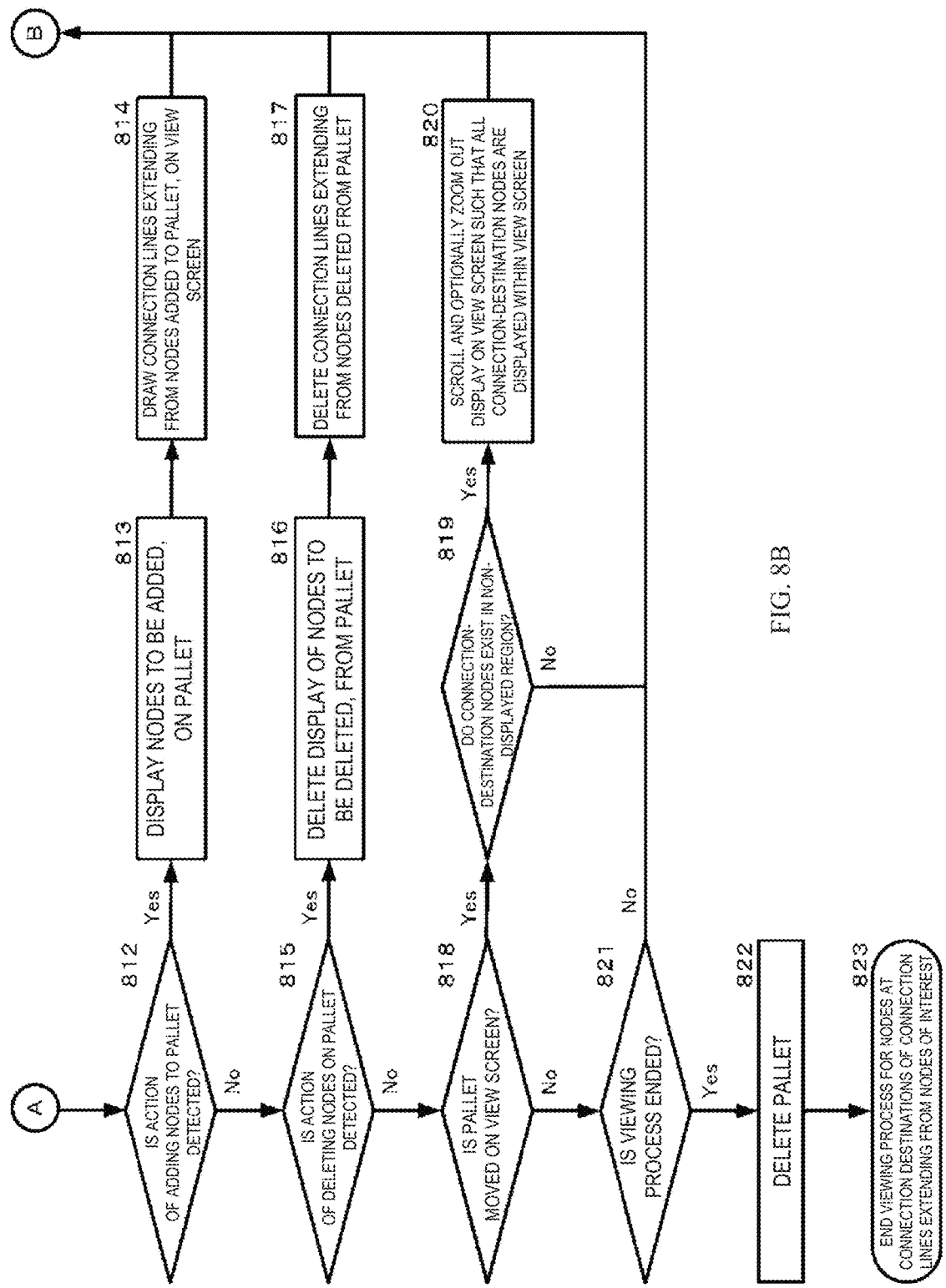
FIG. 8B illustrates an example flowchart for displaying nodes according to the embodiment of the present invention.

FIG. 8A and FIG. 8B illustrate an example flowchart for displaying nodes according to the embodiment of the present invention.

In Step 801, the computer (101) displays a view screen. A plurality of nodes are displayed on the view screen together with respective connection lines between the nodes.

In Step 802, the computer (101) starts a viewing process for the nodes at the connection destinations of connection lines extending from nodes of user's interest. The viewing process can be started by, for example, selecting, by the user, a menu for starting the viewing process from a menu of an application that displays the view screen, with, for example, the mouse or the user's operation finger. The viewing process can be performed as one of operations or functions while the view screen is displayed.

In Step 803, the computer (101) detects that one or more nodes of user's interest are selected by the user on the view screen.

In Step 804, in response to detection of the nodes of interest, the computer (101) displays a pallet. Then, the computer (101) displays the selected one or more nodes on the pallet.

In Step 805, the computer (101) draws connection lines extending from the one or more nodes displayed on the pallet, on the view screen.

In Step 806, the computer (101) determines whether or not one or more connection lines extending from the one or more nodes displayed on the pallet are selected. In response to a determination that the one or more connection lines are selected, the computer (101) proceeds the processing to Step 807. On the other hand, in response to a determination that the one or more connection lines are not selected, the computer (101) proceeds the processing to Step 809.

In Step 807, in response to a determination that the one or more connection lines are selected, the computer (101) determines whether or not one or more nodes (hereinafter, also referred to as connection-destination nodes) at the connection destinations of the selected one or more connection lines exist in the non-displayed region outside of the view screen. In response to a determination that the one or more connection-destination nodes exist in the non-displayed region outside of the view screen, the computer (101) proceeds the processing to Step 808. On the other hand, in response to a determination that the one or more connection-destination nodes do not exist in the non-displayed region outside of the view screen, the computer (101) returns the processing to Step 806.

In Step 808, the computer (101) scrolls and optionally zooms out the display on the view screen such that all the nodes at the connection destinations of the connection lines selected in Step 806 are displayed within the view screen. Moreover, the computer (101) can optionally highlight the nodes at the connection destinations of the connection lines selected in Step 806 (for example, can change the color of the nodes at the connection destinations, and can floatingly display the nodes at the connection destinations). In response to the scrolling process (and, optionally, the zoom-out process) having ended, the computer (101) returns the processing to Step 806.

In Step 809, the computer (101) determines whether or not one or more nodes on the pallet are selected. In response to a determination that the one or more nodes on the pallet are selected, the computer (101) proceeds the processing to Step 810. On the other hand, in response to a determination that the one or more nodes on the pallet are not selected, the computer (101) proceeds the processing to Step 812.

In Step 810, in response to a determination that the one or more nodes on the pallet are selected, the computer (101) determines whether or not one or more nodes (connection-destination nodes) at the connection destinations of the selected one or more nodes exist in the non-displayed region outside of the view screen. In response to a determination that the one or more connection-destination nodes exist in the non-displayed region outside of the view screen, the computer (101) proceeds the processing to Step 811. On the other hand, in response to a determination that the one or more connection-destination nodes do not exist in the non-displayed region outside of the view screen, the computer (101) returns the processing to Step 806.

In Step 811, the computer (101) scrolls and optionally zooms out the display on the view screen such that all the nodes at the connection destinations of the nodes selected in Step 809 are displayed within the view screen. Moreover, the computer (101) can optionally highlight the nodes at the connection destinations of the nodes selected in Step 809 (for example, can change the color of the nodes at the connection destinations, and can floatingly display the nodes at the connection destinations). In response to a determination the scrolling process (and, optionally, the zoom-out process) having ended, the computer (101) returns the processing to Step 806.

In Step 812, the computer (101) determines whether or not an action of adding one or more nodes on the view screen to the pallet is detected. In response to a determination that the adding action is detected, the computer (101) proceeds the processing to Step 813. On the other hand, in response to a determination that the adding action is not detected, the computer (101) proceeds the processing to Step 815.

In Step 813, in response to a determination that the adding action is detected, the computer (101) displays the nodes to be added, on the pallet.

In Step 814, the computer (101) draws connection lines extending from the nodes added to the pallet, on the view screen. In response to that the process of drawing the connection lines is ended, the computer (101) returns the processing to Step 806.

In Step 815, the computer (101) determines whether or not an action of deleting one or more nodes on the pallet is detected. In response to a determination that the deleting action is detected, the computer (101) proceeds the processing to Step 816. On the other hand, in response to a determination that the deleting action is not detected, the computer (101) proceeds the processing to Step 818.

In Step 816, in response to a determination that the deleting action is detected, the computer (101) deletes the display of the nodes to be deleted, from the pallet.

In Step 817, the computer (101) deletes connection lines extending from the nodes deleted from the pallet. In response the process of deleting the connection lines having ended, the computer (101) returns the processing to Step 806.

In Step 818, the computer (101) determines whether or not the pallet is moved on the view screen. In response to a determination that the pallet is moved on the view screen, the computer (101) proceeds the processing to Step 819. On the other hand, in response to a determination that the pallet is not moved on the view screen, the computer (101) proceeds the processing to Step 821.

In Step 819, in response to a determination that the pallet is moved on the view screen, the computer (101) determines whether or not the connection-destination nodes of the connection lines selected in Step 806 or the connection-destination nodes of the nodes selected in Step 809 exist in the non-displayed region outside of the view screen. In response to a determination that the connection-destination nodes exist in the non-displayed region outside of the view screen, the computer (101) proceeds the processing to Step 820. On the other hand, in response to a determination that the connection-destination nodes do not exist in the non-displayed region outside of the view screen, the computer (101) returns the processing to Step 806.

In Step 820, the computer (101) scrolls and optionally zooms out the display on the view screen such that all the connection-destination nodes determined in Step 819 are displayed within the view screen. In response to the scrolling process (and, optionally, the zoom-out process) having ended, the computer (101) returns the processing to Step 806.

In Step 821, the computer (101) determines whether or not an end command for the viewing process is received. The end command can be issued by, for example, selecting, by the user, a menu for ending the viewing process from the menu of the application that displays the view screen, with, for example, the mouse or the user's operation finger. Alternatively, the end command can be issued by, for example, clicking, by the user, a close icon (an icon indicating a process of deleting the pallet) on the pallet with, for example, the mouse or his/her operation finger. In response to a determination that the end command for the viewing process is received, the computer (101) proceeds the processing to Step 822. On the other hand, in response to a determination that the end command for the viewing process is not received, the computer (101) returns the processing to Step 806.

In Step 822, in response to t a determination that the end command for the viewing process is received, the computer (101) deletes the pallet from the screen.

In Step 823, the computer (101) ends the viewing process for the nodes at the connection destinations of the connection lines extending from the nodes of user's interest.

Figure 9:
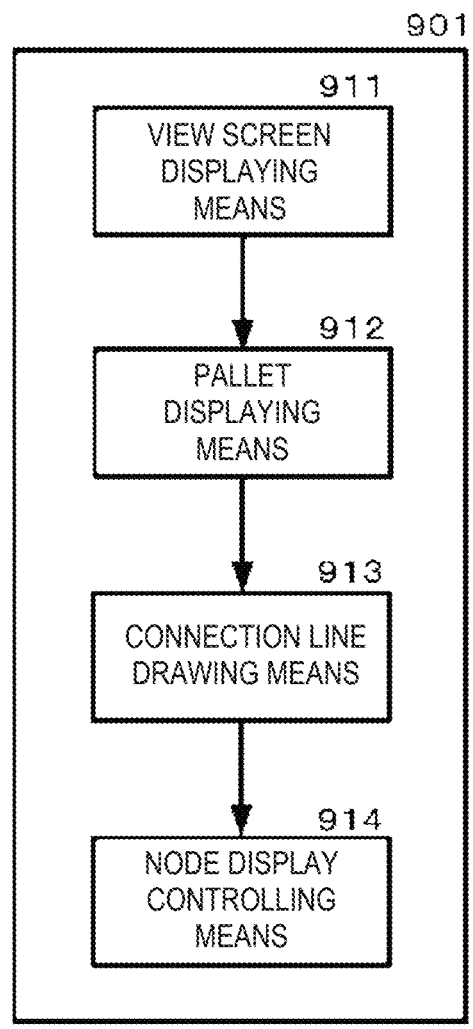
FIG. 9 is a diagram illustrating example functional blocks of a computer according to the embodiment of the present invention or usable in the present invention, the computer preferably including a hardware configuration illustrated in FIG. 1.

FIG. 9 is a diagram illustrating example functional blocks of a computer according to the embodiment of the present invention or usable in the present invention, the computer preferably including a hardware configuration illustrated in FIG. 1.

A computer (901) can execute a process of displaying nodes, and can be, for example, the computer (101) illustrated in FIG. 1.

The computer (901) includes view screen displaying means (911), pallet displaying means (912), connection line drawing means (913), and node display controlling means (914).

The view screen displaying means (911) displays a plurality of nodes and respective connection lines between the nodes on a view screen.

Moreover, the view screen displaying means (911) can execute Step 801 illustrated in FIG. 8A.

In response to that one or more nodes are selected by the user on the view screen, the pallet displaying means (912) displays the selected one or more nodes on a pallet.

Moreover, in response to a determination that an action of adding one or more nodes on the view screen to the pallet is detected, the pallet displaying means (912) can display the nodes to be added, on the pallet.

Moreover, in response to a determination that an action of deleting any of the nodes displayed on the pallet is detected, the pallet displaying means (912) can delete the display of the nodes to be deleted, from the pallet.

Moreover, in response to a determination that the pallet is moved to another position on the view screen, the pallet displaying means (912) can display the pallet to the movement destination.

Moreover, the pallet displaying means (912) can floatingly display the pallet on the view screen.

Moreover, in response to a determination that the end command for the viewing process is received, the pallet displaying means (912) can delete the pallet from the screen.

Moreover, the pallet displaying means (912) can execute Step 803 and Step 804 illustrated in FIG. 8A and Step 812, Step 813, Step 815, Step 816, Step 821, and Step 822 illustrated in FIG. 8B.

The connection line drawing means (913) draws connection lines extending from the one or more nodes displayed on the pallet, on the view screen.

Moreover, in response to a determination that the nodes to be added are displayed on the pallet, the connection line drawing means (913) can draw connection lines extending from the nodes added to the pallet, on the view screen.

Moreover, in response to a determination that the display of the nodes to be deleted is deleted from the pallet, the connection line drawing means (913) can delete connection lines extending from the nodes deleted from the pallet.

Moreover, the connection line drawing means (913) can execute Step 805 illustrated in FIG. 8A and Step 814 and Step 817 illustrated in FIG. 8B.

In response to a determination that one or more connection lines extending from the one or more nodes displayed on the pallet are selected or that one or more nodes on the pallet are selected, the node display controlling means (914) scrolls and optionally zooms out the display on the view screen such that one or more nodes at the connection destinations of the selected connection lines or one or more nodes at the connection destinations of connection lines extending from the selected nodes are displayed within the view screen.

Moreover, in response to a determination that one or more connection lines extending from the one or more nodes displayed on the pallet are further selected or that one or more nodes on the pallet are further selected, the node display controlling means (914) can scroll and optionally zoom out the display on the view screen such that one or more nodes at the connection destinations of the further selected connection lines or one or more nodes at the connection destinations of connection lines extending from the further selected nodes are displayed within the view screen.

Moreover, in response to a determination that one or more connection lines extending from the one or more nodes displayed on the pallet to which the nodes are added are selected or that one or more nodes on the pallet to which the nodes are added are selected, the node display controlling means (914) can scroll and optionally zoom out the display on the view screen such that one or more nodes at the connection destinations of the selected connection lines or one or more nodes at the connection destinations of connection lines extending from the selected nodes are displayed within the view screen.

Moreover, in response to that one or more connection lines extending from the one or more nodes displayed on the pallet from which the nodes are deleted are selected or that one or more nodes on the pallet from which the nodes are deleted are selected, the node display controlling means (914) can scroll and optionally zoom out the display on the view screen such that one or more nodes at the connection destinations of the selected connection lines or one or more nodes at the connection destinations of connection lines extending from the selected nodes are displayed within the view screen.

Moreover, in response to a determination that the pallet is moved to an arbitrary position on the view screen, the node display controlling means (914) can scroll and optionally zoom out the display on the view screen such that the one or more nodes at the connection destinations of the selected connection lines or the one or more nodes at the connection destinations of the connection lines extending from the selected nodes are displayed within the view screen.

Moreover, the node display controlling means (914) can execute Step 806 to Step 811 illustrated in FIG. 8A and Step 818 to Step 820 illustrated in FIG. 8B.

A computer program product of the present invention comprises a computer readable hardware storage device having computer readable program code stored therein, said program code containing instructions executable by a processor of a computer system to implement the methods of the present invention.

A computer system of the present invention comprises a processor, a memory, and a computer readable hardware storage device, said storage device containing program code executable by the processor via the memory to implement the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for displaying nodes, comprising:
   displaying, by a processor of a computer on a display of the computer, a view screen on which a plurality of nodes of a set of two or more nodes are displayed together with two or more connection lines, wherein each node of the plurality of nodes is displayed as being in direct physical contact with at least one connection line of the two or more connection lines;
   receiving, by the processor, a selection of one or more nodes of the displayed plurality of nodes;
   displaying, by the processor in response to said receiving the selection of one or more nodes, the selected one or more nodes on a pallet on the view screen, wherein the pallet on the view screen partially covers each node of the one or more nodes to obscure a covered portion of each covered node from the view screen;
   rendering, by the processor on the view screen, for each node of the one or more nodes displayed on the pallet, one or more connection lines extending from each node of the one or more nodes displayed on the pallet, wherein
      each extending connection line corresponds to a connection line of the at least one connection line in direct physical contact with each node of the selected one or more nodes, and
      each extending connection line is connected to a corresponding destination node in the plurality of nodes of the set of two or more nodes, wherein the corresponding destination node is not currently displayed on the view screen; and
   scrolling and magnifying, by the processor, the view screen to render the pallet in the view screen together with
      a first node of the one or more nodes displayed on the pallet,
      a first connection line extending from the first node to a first destination node displayed outside the pallet, and
      the first destination node.

2. The method of claim 1, further comprising:
   detecting, by the processor, a second node of the plurality of nodes on the view screen being dragged onto the pallet from the view screen;
   adding, by the processor, the second node to the pallet;
   rendering, subsequent to the adding, the second node and the one or more nodes on the pallet together on the view screen;
   rendering, by the processor on the view screen, a second connection line extending from the second node added to the pallet to a second destination node in the set of two or more nodes, wherein the second destination node is not currently displayed on the view screen; and
   scrolling and magnifying, by the processor, the view screen to render, on the view screen,
      the second destination node,
      the pallet,
      the second connection line, and
      the extending connection lines extending from each node of the one or more nodes displayed on the pallet.

3. The method of claim 1, said method further comprising:
   detecting, by the processor, a second node of the one or more nodes on the pallet being dragged from the pallet onto the view screen;
   deleting, by the processor in response to detecting the second node being dragged from the pallet onto the view screen, the second node from the pallet; and
   deleting, by the processor in response to detecting the second node being dragged from the pallet onto the view screen, a second connection line extending from the second node on the pallet prior to second node being dragged from the pallet.

4. The method of claim 1, further comprising:
   moving, by the processor, the displayed pallet to different positions on the view screen.

5. The method of claim 4, wherein the pallet on the view screen partially covers each node of the one or more nodes to
   obscure, from the view screen, a covered portion of each node of the one or more nodes, and
   render visible, on the view screen, a remaining uncovered portion of each node of the one or more nodes.

6. The method of claim 1, wherein the pallet on the view screen completely covers each node of the one or more nodes to obscure, from the view screen, all portions of each covered node.

* * * * *